(12) United States Patent
O'Brien et al.

(10) Patent No.: US 9,242,799 B1
(45) Date of Patent: Jan. 26, 2016

(54) DYNAMICALLY RECONFIGURABLE INVENTORY PODS

(71) Applicant: Amazon Technologies, Inc., Seattle, WA (US)

(72) Inventors: Barry James O'Brien, Seattle, WA (US); James Christopher Curlander, Mercer Island, WA (US); Robert Alexander Colburn, Seattle, WA (US); Andrew Stubbs, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/518,773

(22) Filed: Oct. 20, 2014

(51) Int. Cl.
*G06F 7/00* (2006.01)
*B65G 1/137* (2006.01)
*G05B 15/02* (2006.01)

(52) U.S. Cl.
CPC .............. *B65G 1/1371* (2013.01); *G05B 15/02* (2013.01)

(58) Field of Classification Search
None
See application file for complete search history.

(56) References Cited

U.S. PATENT DOCUMENTS

2006/0111811 A1* 5/2006 Okamoto ................. B25J 5/007
700/214

* cited by examiner

*Primary Examiner* — Yolanda Cumbess
(74) *Attorney, Agent, or Firm* — Lee & Hayes, PLLC

(57) ABSTRACT

An inventory system has inventory pods that are freely and independently moved about a facility and include inventory holders having dynamically reconfigurable storage bins. For various operating scenarios, the components of the inventory system are directed to dynamically reconfigure the storage bins, thereby maintaining efficient product density amongst the inventory holders and permitting the use of automated equipment to manipulate inventory items stored in the inventory pods. One or more inventory pods may be used with lifting modules and picking modules to dynamically reconfigure the storage bins as inventory items are added to and removed from the inventory holders.

20 Claims, 12 Drawing Sheets

400

FROM FIG. 4A

SELECT THE INVENTORY POD TO STORE A SECOND INVENTORY ITEM IN THE INVENTORY SYSTEM AND DIRECT A PICKER MODULE TO PLACE THE SECOND INVENTORY ITEM IN THE INVENTORY HOLDER OF THE INVENTORY POD.
430

DIRECT A PICKER MODULE TO PLACE A SECOND REMOVABLE DIVIDER ADJACENT TO THE SECOND INVENTORY ITEM AND ASSOCIATE A SECOND ITEM IDENTIFIER CORRESPONDING TO THE SECOND INVENTORY ITEM WITH ONE OR MORE IDENTIFIERS CORRESPONDING TO A SECOND BIN OF THE INVENTORY POD STORING THE SECOND INVENTORY ITEM.
436

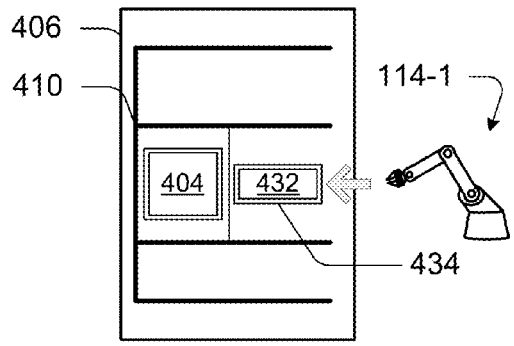

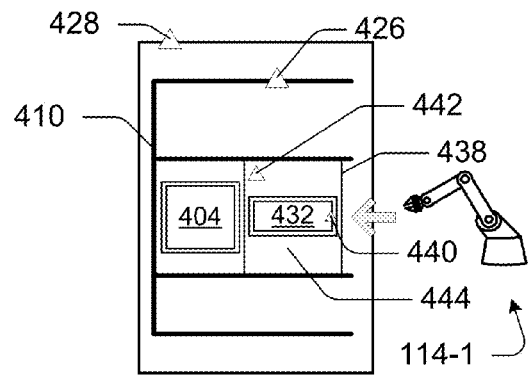

FROM FIG. 6A

DETERMINE THAT THE REMOVAL OF THE FIRST REMOVABLE DIVIDER HAS ENLARGED A SECOND BIN OF THE INVENTORY HOLDER CONTAINING A SECOND INVENTORY ITEM.
628

RECONFIGURE THE SECOND BIN AND A THIRD BIN, AND STORE INVENTORY HOLDER STATUS INFORMATION ASSOCIATED WITH THE RECONFIGURED BINS.
634

DYNAMICALLY RECONFIGURABLE INVENTORY PODS

BACKGROUND

Modern inventory systems, such as those in mail-order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. For instance, in product distribution centers (e.g., fulfillment centers), vast quantities of products are processed for shipment to consumers traditionally using manual labor and/or mechanical handling equipment.

Inventory systems that are tasked with responding to large numbers of diverse inventory requests typically exhibit inefficient utilization of system resources, including space and equipment. For example, some equipment may not be properly suited to interface efficiently with modern mechanical handling equipment. As a result, inventory systems may experience lower throughput, unacceptably long response times, and an ever-increasing backlog of unfinished tasks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 4A-B, 5A-B, 6A-B, 7 and 8 illustrate example processes for dynamically reconfiguring inventory pods, according to some implementations.

DETAILED DESCRIPTION

Figure 1:
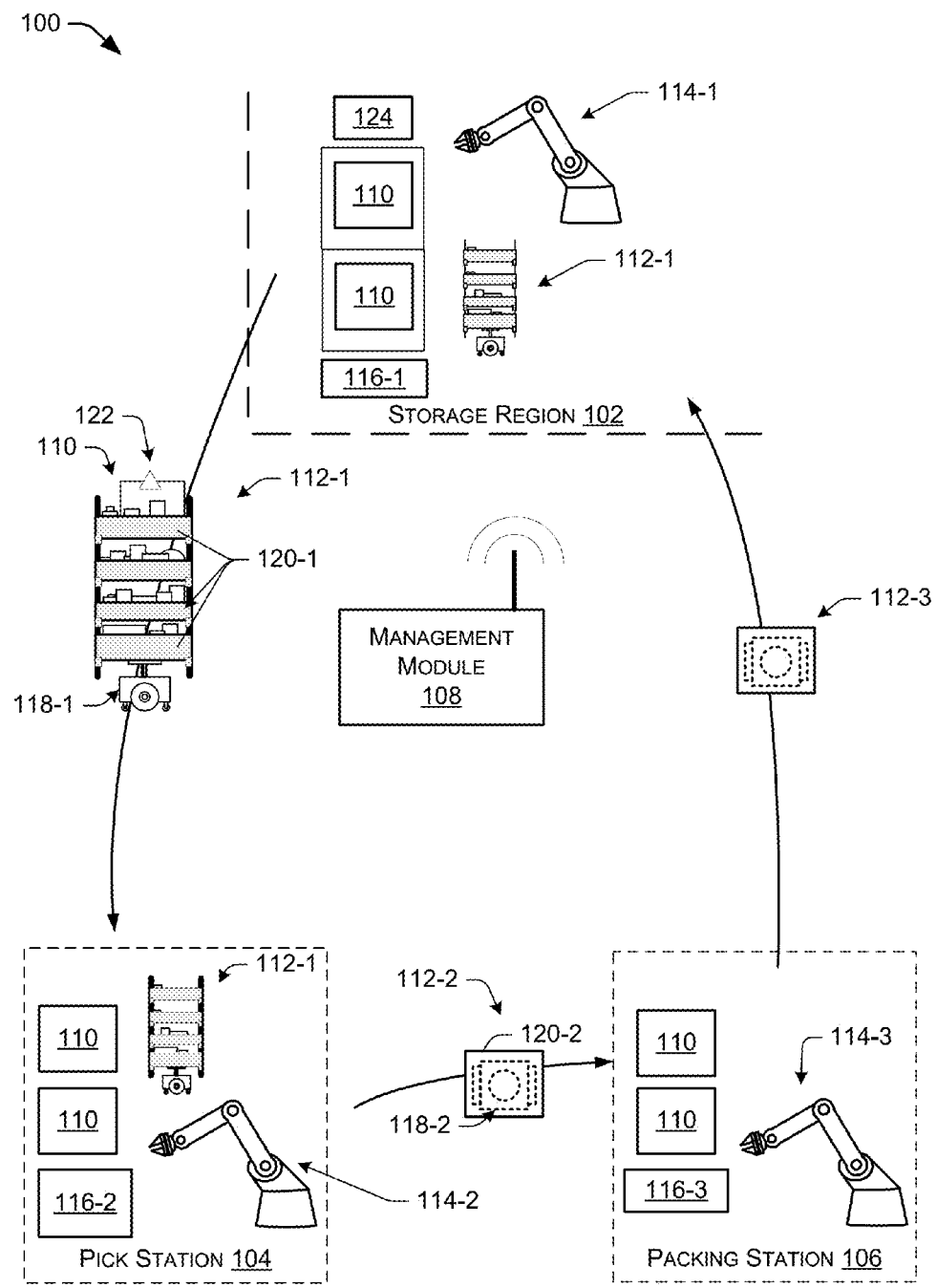
FIG. 1 illustrates an inventory system having multiple regions and inventory pods that carry inventory items about the regions.

Inventory systems employing robotic devices are utilized by many entities for storing and managing inventory. For example, some retailers may use robotic arms to pick and stow inventory items within a warehouse. Further, some retailers may store and transport inventory items throughout the warehouse via inventory pods.

Inventory systems of the present disclosure utilize one or more dynamically reconfigurable inventory pods to transport inventory items between locations within a warehouse. The inventory pods may be moved by one or more mobile drive units and include one or more inventory holders. The inventory holders may be horizontal shelves, with each shelf including dynamically sized storage bins for storing inventory items. Each bin may contain a single inventory item. Further, the size of the bins may be adjusted dynamically to fit the single inventory item. Mobile drive units may be self-powered robotic devices configured to move freely about the warehouse. The mobile drive units may transport the inventory pods between various inventory stations within the warehouse for the performance of inventory operations. The inventory stations may include automated equipment (e.g., a robotic arm, Cartesian coordinate robot, etc.) to add and remove inventory items from the bins in accordance with the inventory operations. Throughout this document, reference is made to inventory pods having one or more inventory holders as the units that are moved about by the mobile drive units. It is noted that the term inventory holders is used in the general sense as structures that hold inventory items, items that are part of a request, items that are part of an order, packaging elements for the orders, and essentially any other item or element that might be used by the inventory and fulfillment system. As such, inventory holders may also be referred to as holders, request holders, order holders, container holders, and so forth. Further, it is noted that the term bins is used in the general sense as structures that hold one or more inventory items, and form at least a part of an inventory holder. As such, bins may also be referred to as inventory holder locations, inventory holder positions, and so forth. In some examples, inventory holder positions may define the relative locations of bins within an inventory holder.

In some inventory systems, bins may contain a plurality of inventory items, thus making it difficult to employ a robotic arm for the manipulation of inventory items. For instance, robotic arms with grasping end effectors may struggle to efficiently distinguish between multiple items in a shared bin, thus slowing down operations that rely on the ability of the robotic arm to retrieve items at high speeds. Further, in some instances, the inability of robotic arms to distinguish between items stored together in a shared bin may even cause inadvertent damage to items. However, allocating a bin of a fixed size to a single inventory item may cause inefficient utilization of the surface area of an inventory holder consisting of a plurality of bins. As such, the ability for bins to dynamically adjust with respect to the size of an inventory item stored within the bin allows the inventory system to institute a one to one mapping between inventory items and bins, while also providing high product density within the inventory holder. Further, the ability to transport inventory items to and from an inventory holder with robotic arms rather than human workers may vastly increase efficiency and productivity within the inventory system. For example, by utilizing dynamically reconfigurable inventory pods, an inventory system may be capable of fulfilling more requests per hour than previous solutions.

To use a simple illustration, in a distribution warehouse storing sporting goods, a management module may receive a request to retrieve a basketball, several soccer balls, and a tennis racquet bag from within the warehouse. The management module may determine that the request items are of a similar width and may occupy a shared storage channel of an inventory holder. The management module may determine the locations of the request items within a storage region in the distribution warehouse. For instance, the request items may be stored at three separate locations within the storage region. As such, the management module may issue tasks for an inventory pod, having a storage channel of an inventory holder matching the widths of the request items, to be moved to retrieve each request item from its respective location within the storage region. The management module may further issue tasks for a robotic arm to place the request items in the storage channel of the inventory holder. In addition, as the robotic arm places individual inventory items into the storage channel of the inventory holder, the management module may further issue tasks for the robotic arm to place removable dividers adjacent to the request items within the storage channel of the inventory holder. Alternatively, or additionally, the management module may issue tasks for the robotic arm to place an item and a removable divider within the storage channel of the inventory holder simultaneously.

After the request items have been placed in the inventory pod, the management module may direct the inventory pod having the request items to be moved to a packing station at which a robotic arm may pick the request items from the inventory holder and pack the request items into a box for shipment. As the robotic arm removes the individual request items from the storage channel of the inventory holder, the management module may further issue tasks for the robotic arm to remove the removable dividers adjacent to the request items in the storage channel of the inventory holder. Alternatively, or additionally, the management module may issue tasks for the robotic arm to remove an item and an adjacent removable divider simultaneously. Further, the management module may further issue tasks to shift items remaining in the storage channel into storage channel areas vacated by the removed request items. In doing so, the management module may coordinate the various tasks such that all of the requests received by the management module are expeditiously fulfilled while efficiently managing the storage capacity of the inventory pod.

Once the management module receives a task related to an inventory item, the management module may determine the physical dimensions of the item. In some examples, the management module may determine the physical dimensions from an inventory item database that includes physical dimensions of inventory items based in part on an identifier of the item. The inventory item database may further include near real-time locations of inventory items stored in the warehouse. In some other examples, the management module may determine the physical dimensions of the item by instructing one or more sensors, such as an imaging sensor or a 3D sensor, to perform a sensor reading of the item.

After determining the physical dimensions of the item, the management module may select both an inventory pod and a storage channel of an inventory holder of the inventory pod to store and transport the item in accordance with received task. In some examples, the management module may select an inventory pod to store and transport the item based on the destination of the item, the physical dimensions of the item in relation to the dimensions of the inventory holders of the inventory pod, and/or the unused storage channel areas of the inventory holders of the inventory pod. For instance, the management module may assign an item to a storage channel of the second inventory holder from the bottom of an empty inventory pod based upon the determination that the vertical space above the inventory holder is sufficient for storing an item having the height of the item, and the width of the storage channel of the second inventory holder provides for efficient utilization of the surface area of the inventory holder. In some examples, the management module may determine the dimensions of the inventory holders of the inventory pod, and/or the unused storage channel areas of the inventory holders of the inventory pod from an inventory pod database.

The management module may direct the selected inventory pod to the location of the item. Further, the management module may direct a picking module (e.g., a robotic arm) to transport the item from its storage location to a location within the storage channel of the inventory holder. In addition, the management module may direct the picking module to place a removable divider inside of the storage channel, thus establishing a bin within the channel dynamically adapted to the size of the item. In some examples, one or more individual channels of the inventory holder may have a closed end and open end. Further, the management module may direct the picking module to place the first item of the channel adjacent to the closed end and the removable divider on the opposite side of the item from the closed end. In some other examples, the management module may direct the picking module to place the removable divider on the side of the item opposite a removable divider previously placed inside the channel of the inventory holder.

The management module may direct the inventory pod and/or a lifting module to adjust the inventory holders of the inventory pod prior to placing the item in the inventory holder. In some examples, the management module may store a record of the vertical distances between the inventory holders of the inventory pod in an inventory pod database as inventory holder status information. In some other examples, the inventory pod and/or the lifting module may use one or more sensors to determine the vertical space between the inventory holders of the inventory pod.

Further, the management module may determine whether the picking module can place the item in the inventory holder in light of the vertical distance between the inventory holder and a second inventory holder located directly above the inventory holder. If the vertical space is not sufficient, the management module may direct the lifting module to adjust the vertical distance between the inventory holders to accommodate the item. In some examples, the lifting module may include a mechanical lifting device separate from the inventory pod (e.g., a forklift). In some other examples, the inventory pod may include lifting modules attached to the inventory holders to adjust the inventory holders.

After the item is placed into the inventory holder, the vertical distance between the inventory holders may be re-adjusted to minimize the height of the inventory pod and/or minimize the vertical distances between the inventory holders. Further, the management module may update the vertical distance values between the inventory holders of the inventory pod within the inventory pod database to reflect any changes made during the vertical adjustments.

The inventory holder status information may include, for individual inventory pods, data representing the contents of the bins of the inventory holders of the inventory pod, the current sizes of the bins of the inventory holders of the inventory pod, the current dimensions of the channels of the inventory holders of the inventory pods, and the locations of the bins within the inventory holders. Further, inventory holder status information may include one or more values representing available area to store additional inventory items. For example, the inventory holder status information may indicate available surface area within one or more storage channels of an inventory pod. Further, the inventory holder status information may indicate whether an inventory pod is unable to store any additional inventory items (i.e., filled to capacity). Additionally, the inventory pod database may include near real-time location information associated with the individual inventory pods operating within the warehouse.

In some examples, the management module may direct the inventory pod, lifting module, and/or a robotic arm at an inventory station to horizontally adjust one or more of the inventory holders in order to manipulate an item associated with a bin of the inventory pod. For example, the inventory pod may slide an inventory holder horizontally out from under one or more other inventory holders positioned above the inventory holder. Further, the inventory pod database may include information indicating whether an inventory pod is capable of horizontal or vertical adjustment of its inventory holders.

Once the picking module places the item within a bin of the inventory pod, the management module may generate an association between the item, the inventory pod, the inventory holder, and the bin. For example, the management module may link a unique identifier of the item to a unique identifier of the inventory pod and/or a location identifier of the bin of the inventory pod. The association between the item and its bin may be stored in the inventory item database and/or the inventory pod database as inventory holder status information.

The management module may direct the inventory pod to other inventory locations within the warehouse. At some inventory locations, the management module may direct a picking module at the respective location to place additional items in the inventory holders of the inventory pod. The management module may direct the picking module to place an item adjacent to a pre-existing removable divider within the storage channel of an inventory holder. Further, the management module may direct the picking module to place a removable divider on the side of the item opposite the preexisting removable divider. Further, prior to placing another item in another inventory holder of the inventory pod, the management module may direct a lifting module to adjust the vertical space between the inventory holders of the inventory pod. After the picking module places the other item in the other inventory holder, the management module may update the item database and/or inventory pod database to reflect the storage of the additional items in the inventory pod. Further, the management module may update the inventory holder status information of the inventory pod to reflect any changes made to the vertical space between the inventory holders of the inventory pod.

At some inventory locations, the management module may direct a picking module at the respective location to remove an item in one of the inventory holders of the inventory pod. Further, the management module may direct the picking module to remove a removable divider that was adjacent to the removed item. In some examples, the picking module may remove the removable divider closest to an open end of the channel of the inventory holder that contained the item. Further, the management module may disassociate the item from the inventory pod, the inventory holder, and the bin within the item database and/or the inventory pod database. For example, the management module may delete a link between the unique identifier of the item and a bin identifier stored within the item database and/or inventory pod database.

Once the picking module removes an item, the management module may determine that removing the removable divider has enlarged one of the remaining bins of the storage channel that contained the removable divider. In response, the management module may direct the inventory pod and/or a picking module at the location to reconfigure the enlarged bin. In some examples, the management module may determine that a bin has been enlarged based on inventory holder status information. For instance, the inventory holder status information may indicate that the area of the storage channel vacated by a removed item is mapped to the enlarged bin after the removal of a removable divider that was adjacent to the bin. In some other instances, a sensor at the station may determine that a bin has been enlarged based upon a sensor reading of the bins of the inventory holder. For example, a sensor reading may indicate a change in the size of a bin and/or a sensor reading may indicate that the bin size does not match the size of an item held in the bin.

In response to the determination that the removal of a divider has enlarged a bin, the management module may direct the picking module to dynamically reconfigure the enlarged bin to a size more appropriate for the item contained in the enlarged bin. In some examples, the picking module may relocate the removable divider opposite the area vacated by the removed item closer to the item contained in the enlarged bin. In some other examples, the picking module may relocate the removable divider closest to the area vacated by the removed item and the item closer to the removable divider opposite the area vacated by the removed item. Further, in some examples the management module may determine the appropriate reconfiguration size of the enlarged bin based upon information stored within the item database and/or the inventory pod database. In some other examples, the appropriate reconfiguration size may be determined via the use of sensors (e.g., pressure sensor, position sensor, proximity sensor, imaging sensor, etc.).

These and other examples of operating an inventory system are described below. The techniques discussed herein may be implemented in many different ways, by many different systems. Various representative implementations are provided below with reference to the figures.

FIG. 1 shows one illustrative example of an inventory system 100 that may be used to implement a technique for dynamically reconfigurable inventory pods. The inventory system 100 may be arranged in a facility or warehouse (e.g., distribution facility, fulfillment center, etc.) that is logically organized into areas, stations, or regions associated with various functions. In the illustrated example, the warehouse includes a storage region 102, a pick station 104, and a packing station 106. In practice, depending upon the size of the inventory system 100, the warehouse may hold more than one of the storage regions 102, pick stations 104, and packing stations 106, or the warehouse may be configured without the storage region 102, or the pick station 104, or the packing station 106.

The inventory system 100 includes a management module 108, inventory items 110, inventory pods 112, such as inventory pods 112-1, 112-2, and 112-3, picking modules 114, such as picking modules 114-1, 114-2, and 114-3, and lifting modules 116, such as lifting modules 116-1, 116-2, and 116-3. Only some of the inventory items 110 are shown referenced with the number 110 for ease of illustration.

Picking modules 114 may retrieve inventory items 110 from the storage region 102, and stock the inventory items 110 in the inventory pods 112. At the pick station 104, picking modules 114 may remove inventory items 110 from the inventory pods 112. Inventory items 110 processed at the pick station 104 may then be delivered to the packing station 106 or another station for further processing. At the packing station 106, inventory items 110 are placed into a shipping containers (e.g., box, envelope, etc.), and prepared for shipping.

In one example, the management module 108 orchestrates movement of the inventory pods 112, directing them to various regions within the warehouse. Furthermore, the management module 108 may be used to instruct the inventory pods 112, the picking modules 114, and the lifting modules 116 to perform the dynamic bin configuration process within a particular region (e.g., storage region 102, pick station 104, packing station 106, etc.) as inventory items 110 are added to and removed from the inventory pods 112. The dynamic bin configuration process may involve directing inventory pods 112 to maintain optimal product density by ensuring that bins of the inventory pod 112 are dynamically sized to fit the inventory items 110 contained in the bins.

The management module 108 may use any form of communication to direct the inventory pods 112, the picking modules 114, and the lifting modules 116. In one example, the management module 108, the inventory pods 112, the picking modules 114, and the lifting modules 116 are configured to communicate using wireless technologies, such as a wireless local area network (WLAN). As one example, some embodiments of the inventory pods 112 may communicate with management module 108 and/or with one another using Wi-Fi (IEEE 802.11), Bluetooth (IEEE 802.15), Infrared Data Association standards, or any other appropriate wireless communication protocol. As another example, in a tracked inventory system 100, tracks or other guidance elements upon which inventory pods 112 move may be wired to facilitate communication between the inventory pods 112 and the management module 108 and/or other components of inventory system 100.

In addition to directing the inventory pods 112, the picking modules 114, and the lifting modules 116, the management module 108 may receive and/or generate requests to initiate any of a number of particular operations involving the inventory pods 112, picking modules 114, lifting modules 116, or other elements of inventory system 100. The management module 108 may select components of inventory system 100 to perform various operations and communicate commands, instructions, and/or other appropriate information to the selected components to facilitate completion of these operations. In FIG. 1, the picking module 114 and/or the lifting module 116 involve mechanical apparatuses, although the picking module 114 and/or the lifting module 116 may alternatively or additionally be human beings.

While the appropriate components of inventory system 100 complete assigned tasks, the management module 108 may interact with the relevant components to ensure the efficient use of space, equipment, and other resources available to inventory system 100. For example, the management module 108 may receive information from the various components of inventory system 100 regarding their current location, state, and/or other characteristics. Based on its knowledge of the location, current state, and/or other characteristics of the various components of inventory system 100 and an awareness of tasks currently being completed, management module 108 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 100 may be able to support a number of techniques for efficiently executing various aspects of the operation of inventory system 100.

For example, the management module 108 may receive a request to stock and/or retrieve one or more inventory items 110 located in the storage region 102. Further, the inventory items may be available for consumer purchase at an electronic marketplace (e.g., websites, peer-to-peer systems, etc.). For instance, a consumer may visit an electronic marketplace where goods and/or services are bought and sold among participants, and submit a purchase order for the inventory items 110. The purchase order may be communicated to the management module 108 to be fulfilled by the inventory system 100. Further, fulfillment of the order by the inventory system 100 may require the processing of the inventory items 110 at one or more stations of the inventory system 100. As such, the management module 108 may orchestrate the transport of the inventory items 110 between stations of the inventory system 100. For instance, the management module 108 may administer the transport of the inventory items 110 from the storage region 102 to the pick station 104 via one or more inventory pods 112.

The inventory pods 112 may be moved by one or more mobile drive units 118, such as mobile drive units 118-1 and 118-2, and include one or more inventory holders 120. Only some of the mobile drive units 118 and inventory holders 120 are shown referenced with the numbers 118 and 120, respectively, for ease of illustration. The mobile drive units 118 may move the inventory holders 120 about the warehouse. The mobile drive units 118 are independent, self-powered robotic devices that may move freely about the warehouse, under their own direction or through coordination by the management module 108. In some other examples, the mobile drive units 118 may be configured to move inventory holders 120 along tracks, rails, cables, or other guidance elements traversing the associated workspace. In such implementations, mobile drive units 118 may receive power through a connection to the guidance elements, such as a powered rail. In some embodiments, the inventory system 100 may include two or more different types of mobile drive units 118 having various capabilities and specifications. Moreover, although illustrated and discussed as though mobile drive units 118 are a particular type of mobile drive unit, mobile drive units 118 may refer to various types of mobile drive units. For example, one type of mobile drive unit 118 may be operable to transport relatively large, heavy, or bulky inventory holders 120. Another type of mobile drive unit 118 may be operable to transport relatively lighter and/or more compact inventory holders 120. Mobile drive units 118 may accordingly have various power trains, load capacities, and other appropriate specifications to transport particular inventory items 110 of various sizes in the inventory holders 120 within the inventory system 100.

The mobile drive units 118 may be used at various times to transport the inventory holders 120 around the warehouse among the regions. For instance, the mobile drive units 118 may transport the inventory holders 120 among the storage region 102, the pick station 104 or the packing station 106.

Each inventory holder 120 may be implemented as a physical structure containing one or more dynamically sized bins to hold inventory items 110. The inventory holder 120 has a physical length, width, and height that may be standardized or varied within the inventory system. As used herein, the inventory holders 120 may be configured to hold essentially any type or size of item or be used for any number of purposes, including, but not limited to, storing and transporting individual items, carrying pallets, storing shipping supplies, transporting garbage, supporting empty boxes waiting for inventory, supporting filled boxes with items once orders are fulfilled, and so on.

In one example, the inventory holders 120 may be formed as closed-back shelf storage units to support various types of inventory items 110. The inventory holders 120 may be constructed of plastic, or other suitable materials. In some examples, the inventory holders 120 may be molded of slippery plastics material (e.g., Ultra High Molecular Weight Polyethylene), so as to give maximum wearing life and minimum friction resistance to the placement of inventory items 110. Individual inventory holders 120 may have a bottom, two opposing vertical side walls, a back wall, and an open front. As such, each inventory holder 120 may be accessible from its top as well as its open front. Alternatively or additionally, a plurality of inventory holders 120 having a top, a bottom, two opposing vertical side walls, a back wall and an open front may be stacked horizontally on the mobile drive unit 118 with the top, the bottom and the two side walls of the inventory holder 120 being vertically positioned, and the back wall facing downward towards a base of the inventory pod. As such, each inventory holder 120 may be accessible vertically from its open front.

Further, each inventory holder 120 may include multiple storage channels demarcated by shelf dividers. In some instances, the shelf dividers may be fixed shelf dividers. In some other instances, the shelf dividers may be semi-permanent, and periodically adjusted to reflect trends amongst the inventory items 110 stored within the warehouse. Under the direction of the management module 108, removable dividers may be perpendicularly placed in between the shelf dividers to form bins within the storage channels for storing inventory items 110. The present invention supports one-to-one mappings and one-to-many mappings between bins and inventory items 110.

The management module 108 may select one or more inventory pods 112 to store the inventory items 110 based at least upon a probable destination of the inventory items 110, the physical dimensions of the inventory items 110 in relation to the dimensions of the inventory holders 120 of the inventory pods 112, and/or the unused surface area of the inventory holders 120 of the inventory pods 112.

The management module 108 may determine the physical dimensions of an inventory item 110 based in part on an item identifier 122 associated with the inventory item 110. The term item identifier refers to a unique identifier associated with each inventory item 110 in the inventory system 100. Typically, but not necessarily, each inventory item 110 is tagged or otherwise marked with an item identifier 122. For example, inventory items 110 may be marked or tagged with a bar code, 2D/3D bar code, Quick Response (QR) code, Near Field Communication (NFC) tag, Radio Frequency Identifier Device (RFID) tag, magnetic stripe, Universal Product Code (UPC), Stock-Keeping Unit (SKU) code, serial number, and/or other designation (including proprietary designations) that may be used as item identifiers 122 to facilitate inventory system operations. In some other examples, the management module 108 may determine the physical dimensions of the inventory items 110 based in part on an imaging process performed by an imaging device or a 3D scanning process performed by a scanner 124 located at the storage region 102.

Once the management module 108 has selected one or more inventory pods 112-1 to store the inventory items 110, the management module 108 may direct the selected inventory pods 112-1 to the locations of the inventory items 110. Further, the management module 108 may direct the picking module 114-1 to place each of the inventory items 110 into one of the selected inventory pods 112-1. Placement of the inventory items 110 may include setting the inventory item 110 on the surface of the inventory holder 120, and/or pushing the inventory item into a specified position within the inventory holder 120. As each inventory item 110 is placed into a storage channel of one of the inventory holders 120 of the selected inventory pods 112-1, the management module 108 may direct the picking module 114-1 to simultaneously place a removable divider adjacent to the inventory item 110 within the storage channel to form a dynamically sized bin. In some examples, the management module 108 may determine the dimensions of the dynamically sized bins, and instruct the picking module 114 to place the removable dividers in accordance with the determined dimensions. In determining the dimensions of a bin, the management module 108 may seek to limit the pressure applied to the inventory item 110 by the dividers forming the bin to a threshold level and/or movement by the inventory item 110 while in transit, thus limiting damage to the inventory items 110 while stored in the bin. Additionally, or alternatively, the picking module 114 may include or employ one or more sensors to determine the dimensions of the dynamically sized bins.

As discussed above, the management module 108 may maintain information tracking the status of the components of the inventory system 100. For instance, once the requested inventory items 110 are placed into the bins of the selected inventory pods 112, the management module 108 may map the item identifiers 122 of the requested inventory items 110 to one or more identifiers of the selected inventory pods 112 and/or the inventory holders 120 containing the requested inventory items 110.

The management module 108 may direct the lifting module 116 to adjust the inventory holders 120 in order to allow the storage of inventory items 110 of various sizes and prevent damage to the inventory items 110 while stored in the inventory pods 112. For example, the management module 108 may instruct the lifting module 116 to adjust the vertical space between the stacked inventory holders 120 of the inventory pod 112 to allow the picking module 114 to safely manipulate the requested inventory items 110 associated with the inventory pod 112-1. Further, the management module 108 may instruct the lifting module 116 to adjust the vertical space between the stacked inventory holders 120 after the picking module 114 has completed its operations. For instance, the management module 108 may instruct the lifting module 116 to adjust the vertical configuration between the inventory holders 120 to a default configuration or a configuration that minimizes the height of the inventory pod 112 while ensuring that items in an inventory holder 120 are not damaged by an overhead inventory holder 120.

Once the inventory items 110 have been placed onto the inventory holders 120 of the selected inventory pods 112-1, the management module 108 may direct the mobile drive unit 118-1 to transport the inventory holders 120-1 of the inventory pod 112-1 to the pick station 104. At the pick station 104, the management module 108 may direct a picking module 114-2 to add inventory items 110 to and remove inventory items 110 from the inventory pods 112-1. Further, the management module 108 may direct the picking module 114-2 to dynamically reconfigure the size of the bins of the inventory pods 112-1 as the inventory items 110 are added to and removed from the inventory pods 112-1. For example, the inventory items 110 placed in the inventory pods 112-1 at the storage region 102 may be removed from the inventory pods 112-1 at the pick station. Further, as each inventory item 110 is removed from the inventory holder 120-1, the management module 108 may direct the picking module 114-2 to simultaneously remove a removable divider adjacent to the inventory item 110 from the inventory pod 112-1. In addition, the management module 108 may direct the picking module 114-2 to dynamically reconfigure bins belonging to inventory holders 120-1 that held the removed inventory items 110. By dynamically configuring the size of the bins of the inventory holders, the management module may isolate inventory items within the bins of an inventory pod while also maintaining an optimal product density of the inventory pod.

Figure 2:
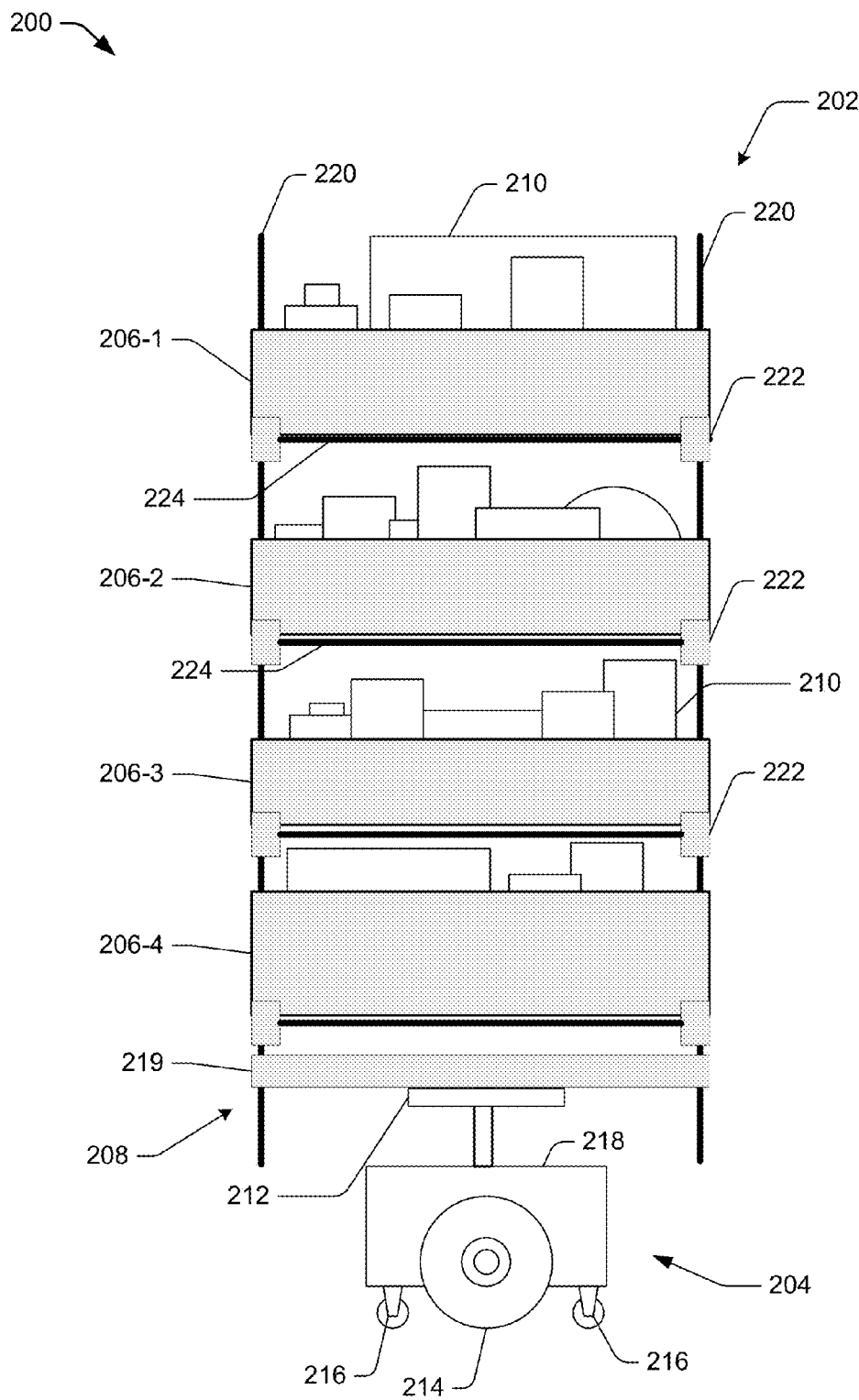
FIG. 2 shows a side view of an inventory pod employed in the inventory system.

FIG. 2 illustrates a side-view illustration of an inventory pod 202 such as inventory pod 112. In this illustration, the inventory pod 202 may be moved by a mobile drive unit 204, such as mobile drive unit 118, and may include inventory holders 206, such as inventory holder 120, and an inventory holder support frame 208. The inventory pod 202 has multiple inventory holders 206, such as inventory holders 206-1, 206-2, 206-3, and 206-4, which support a variety of inventory items 210. It is noted that four inventory holders are merely representative, and that inventory pods 202 may be designed with more or fewer than four inventory holders. Further, only some of the inventory items 210 are shown referenced with the number 210 for ease of illustration.

The inventory items 210 represent any objects suitable for storage, retrieval, and/or processing in an automated inventory system 100. For example, a given inventory item may represent a single stock-keeping unit (SKU) of a unique inventory item 210. Thus, inventory items 210 may refer to a particular item and/or may refer to a quantity of items having a particular SKU as appropriate. As one example, the inventory system 100 may represent a retail distribution warehouse that stores bulk inventory items 210 for retail facilities, such as grocery stores and/or merchandise warehouses. As another example, the inventory system 100 may represent an e-commerce warehouse facility, and inventory items 210 may represent merchandise stored in the warehouse facility.

The mobile drive units 204 may transport the inventory holders 206 by docking with and/or coupling to the inventory holder support frame 208. For example, as illustrated, the mobile drive unit 204 transports inventory holder 206 by moving beneath the inventory holder support frame 208 and lifting a docking head 212 that interfaces with a bottom surface (or other portion) of inventory holder support frame 208. In some examples, the bottom surface of the inventory support frame 208 may be the bottom of the inventory holder 206-4 at the bottom of the stacked inventory holders 206. The docking head 212 may be controlled by an actuator of the mobile drive unit 204 operable to lift inventory support frame 208 when docked. The docking head 212 may couple the mobile drive unit 204 to the inventory support frame 208 or otherwise support the inventory support frame 208 during transportation. The docking head 212 may also include any appropriate features to facilitate coupling to the inventory support frame 208. For example, in some embodiments, a high-friction element may form all or a portion of the docking head 212, which abuts a portion of the inventory support frame 208 while docked. In such embodiments, frictional forces created between the high-friction element of the docking head 212 and a surface of the inventory support frame 208 may induce translational and rotational movement when docked.

The mobile drive unit 204 may utilize the docking head 212 to maneuver the inventory support frame 208, such as by lifting, rotating, and/or moving the inventory support frame 208 in any appropriate manner. In some implementations, the mobile drive unit 204 may be capable of rotating its docking head to rotate the inventory support frame 208 while moving and/or while stopped. In addition or in the alternative, the mobile drive unit 204 may be capable of rotating the docking head independently or as a part of the movement of the mobile drive unit 204 as a whole. For example, the mobile drive unit 204 may rotate the inventory support frame 208 as the mobile drive unit 204 executes a turn such that the inventory support frame 208 continues to face the original direction of movement.

The mobile drive unit 204 is further equipped with multiple drive wheels 214 and multiple stabilizer wheels 216. A motor internal to a body 218 is used to power the drive wheels 214, while the stabilizer wheels 216 provide stability to the drive unit 204 to maintain balance of the coupled inventory support frame 208. Using the drive wheels 214, the mobile drive unit 204 may transport the inventory support frame 208 while the docking head is lifting the inventory support frame 208 or otherwise move the mobile drive unit 204 when the inventory support frame 208 is undocked.

It should be noted that while a particular method of docking with inventory support frame 208 is illustrated, the mobile drive unit 204 may dock with the inventory support frame 208 by connecting to, lifting, and/or otherwise interacting with the inventory support frame 208 in any other suitable manner so that, when docked, the mobile drive unit 204 is coupled to and/or supports inventory support frame 208 and can move inventory support frame 208.

The inventory holder support frame 208 includes a support frame platform 219, support frame columns 220, and support frame spacers 222. Only some of the support frame spacers 222 are shown referenced with the number 222 for ease of illustration. As shown in FIG. 2, the support frame platform 219 may have a top surface and a bottom surface. The top surface of the support frame platform 219 may include outer edges adapted to connect with the support frame columns 220. The bottom face of the support frame platform 219 may include connectors adapted to attach the inventory holder support frame 208 to the mobile drive unit 204.

The support frame columns 220 are vertically disposed elements, e.g., rods, poles, beams, etc., connected to the outer edges of the support frame platform 219. The support frame spacers 222 may be positioned at intervals along the support frame columns 220. The support frame spacers 222 may be removably attached to the support frame columns 220. This may be achieved by any acceptable method for removably attaching or fastening objects together. Alternatively, support frame spacers 222 may be permanently attached to the support frame columns 220 by any appropriate method. Further, the support frame spacers 222 may take any of a wide variety of shapes and forms.

As shown in FIG. 2, the support frame spacers 222 may be grouped together in a set matching the number of support frame columns 220, and connected by inventory holder support elements 224 that are perpendicular to the support frame columns 220. Only some of the inventory holder support elements 224, which may include bars, poles, beams, platforms or other support elements, are shown referenced with the number 224 for ease of illustration.

Each inventory holder 206 should rest on a group of the support frame spacers 222 and their associated inventory holder support elements 224. The inventory holder 206 may rest upon the group of the support frame spacers 222 and remain in position. The support frame spacers 222 serve to maintain the inventory holders 206 in their proper spaced apart relation with respect to each other. The bottom of the inventory holder 206 should rest against the top of the support frame spacers 222, thereby facilitating the stocking of the inventory items 210 into the inventory holders 206 and picking of inventory items 210, vertically from the top or horizontally from the open front, of the inventory holders 206 by robotic arm equipment with grasping end effectors.

In some examples, the frame spacers 222 may be operable to slide and/or shift vertically along the support frame columns 220, thus adjusting the vertical configuration of the stacked inventory holders 206. In addition, the frame spacers may be operable to lock in place at positions along the support frame columns 220, thus maintaining the vertical configuration of the inventory holders 206 with respect to each other. Further, the frame spacers 222 and inventory holder support elements 224 may be operable to adjust the horizontal configuration of the inventory holders 206. For instance, the frame spacers 222 and inventory holder support elements 224 may permit the inventory holders 206 to slide and/or shift in a horizontal direction, thus allowing an inventory holder 206-2 to be pulled out from under an obstructing overhead inventory holder 206-1.

Further, the frame spacers 222 and/or inventory holder support elements 224 may be operable to automatically adjust horizontally and/or vertically under direction of the management module 108 (not shown in FIG. 2). Additionally, or alternatively, a lifting module, such as lifting module 116, may interact with the frame spacers 222 and/or inventory holder support elements 224 to adjust the inventory holders 206 horizontally and/or vertically.

Figure 3:
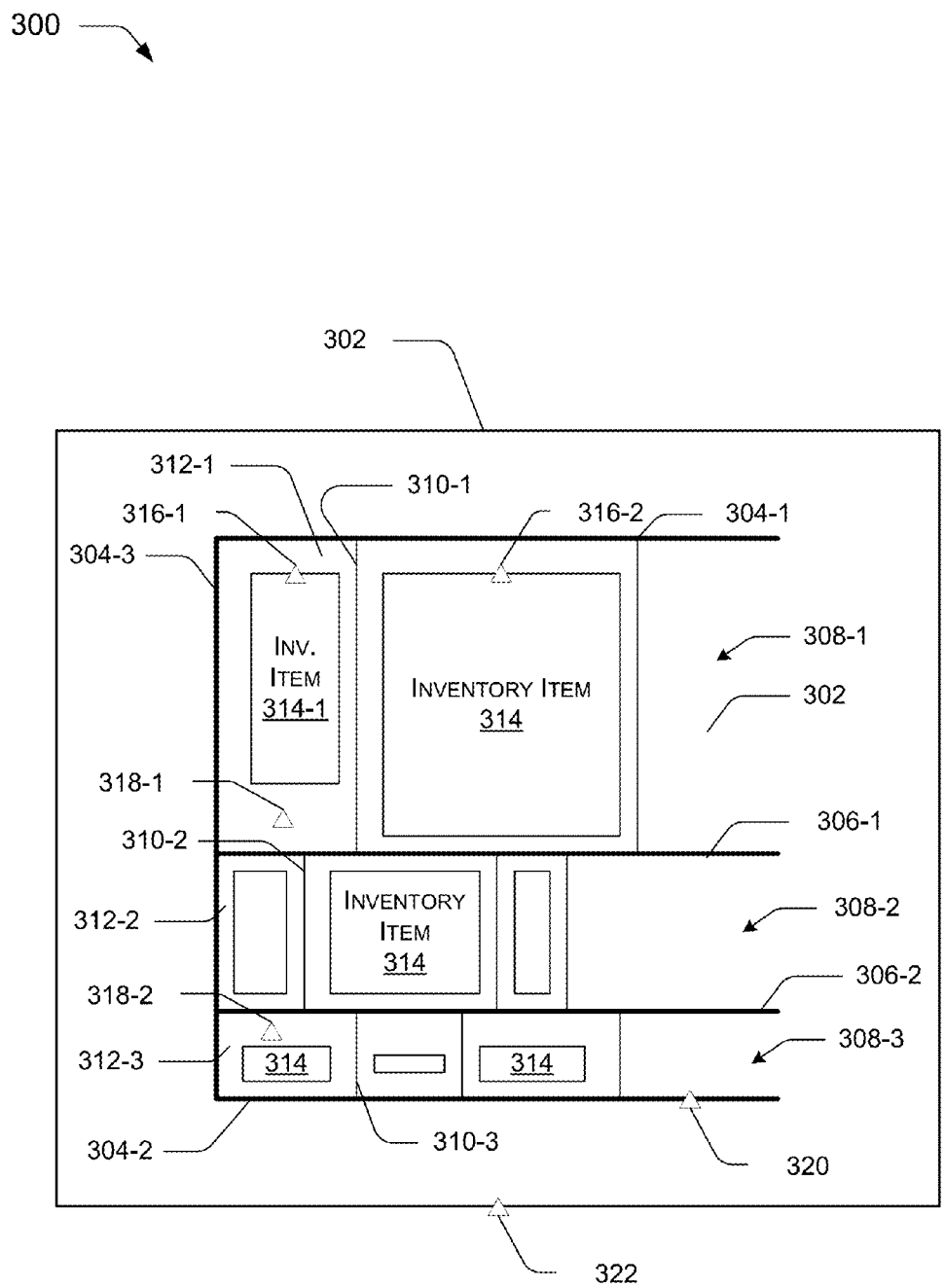
FIG. 3 shows a top view of an inventory pod employed in the inventory system.

FIG. 3 illustrates a top-view illustration of an inventory holder 302, included in inventory pod 300 (only partially shown in FIG. 3). In this illustration, the inventory holder 302 is a closed-back shelf storage unit that includes three vertical side walls 304-1, 304-2, and 304-3, channel dividers 306, such as channel dividers 306-1, 306-2, . . . , storage channels 308, such as storage channels 308-1, 308-2, 308-3, . . . , removable dividers 310, such as removable dividers 310-1, 310-2, 310-3, bins 312, such as bins 312-1, 312-2, and 312-3, and inventory items 314.

As shown in FIG. 3, the three vertical walls 304 form the outer walls of the inventory holder 302. In some other examples, there may only be two parallel vertical walls 304 (e.g., 304-1 and 304-2), thereby forming an inventory holder 302 with two, opposed open faces. The channel dividers 306 are positioned inside the inventory holder 302 parallel to the two vertical walls 304-1 and 304-2, and perpendicular to the vertical wall 304-3. The channel dividers 306-1 and 306-2 separate the inventory holder 302 into the three storage channels 308-1, 308-2, and 308-3. The channel dividers 306 may be removably or permanently attached to at least one the vertical walls 304 and/or a base of the inventory holder 302. In accordance with the methods taught herein, removable bin dividers 310, such as 310-1, 310-2, and 310-3, are placed within the storage channels perpendicular to the channel dividers 306 to form bins 312, such as bins 312-1, 312-2, and 312-3. The removable bin dividers 312 may be readily removable from engagement with the channel dividers 306 and/or the base of the inventory holder 302, enabling convenient adjustment to achieve a variety of bin 312 arrangements. This may be achieved by any acceptable method for removably attaching or fastening objects together, such as a clasp, mount, clamp, hook, interlocking engagement, magnets, etc. Lastly, inventory items 314 may be stored inside the bins 312.

In some examples, the channel dividers 306 may be positioned to establish storage channels 308 having a similar width. However, in some other examples, the channel dividers 306 may be positioned to establish storage channels 308 having variable widths, thereby accommodating inventory items 314 of variable sizes. Further, the size of the storage channels 308 may be periodically adjusted to accommodate trends associated with one or more dimensions of inventory items 314. For example, a plurality of storage channels 308 may be narrowed to reflect an increase in the stocking of small-scale inventory items. When an inventory item 314-1 is stored inside of a bin 312-1, the management module 108 (not shown in FIG. 3) may associate an item identifier 316-1 corresponding to the inventory item 314-1 to a bin identifier 318-1 corresponding to the bin 312-1, and/or an inventory holder identifier 320. In some examples, the bin identifiers 318 and inventory holder identifiers 320 do not have to be unique identifiers within the inventory system 100. For example, the bin identifiers 318 and inventory holder identifiers 320 may be associated with an inventory pod identifier 322 that corresponds to the inventory pod 300, and only need to be uniquely identifiable within the set of identifiers associated with the inventory pod 300.

Further, a bin identifier 318 may represent or have an association with a location of a bin 312 within an inventory holder 302. For example, when a removable divider 310 is added to the inventory holder 302 to form a bin 312, a bin identifier 318 (e.g., "bin 1") may be mapped to a description of the location of the bin 312 (e.g., coordinates, boundaries, markers, etc.). Further, the management module 108 and/or the picking module 114 (not shown in FIG. 3) may be operable to locate the bin 312 within the inventory holder 302 based in part on the description.

Additionally, or alternatively, a bin identifier 318 may be indicated by a bar code, 2D/3D bar code, QR code, NFC tag, RFID tag, magnetic stripe, or some other scannable or readable mechanism, mark, or tag attached to a removable divider 310. As such, a bin 312 may be associated with the bin identifier 318 based in part on the placement of the removable divider 310 into the inventory holder 302 to form the bin 312. Further, the management module 108 and/or the picking module 114 may be operable to scan or read the bin identifier 318 on the removable divider 310 as a means of locating the bin 312.

Figure 4A:
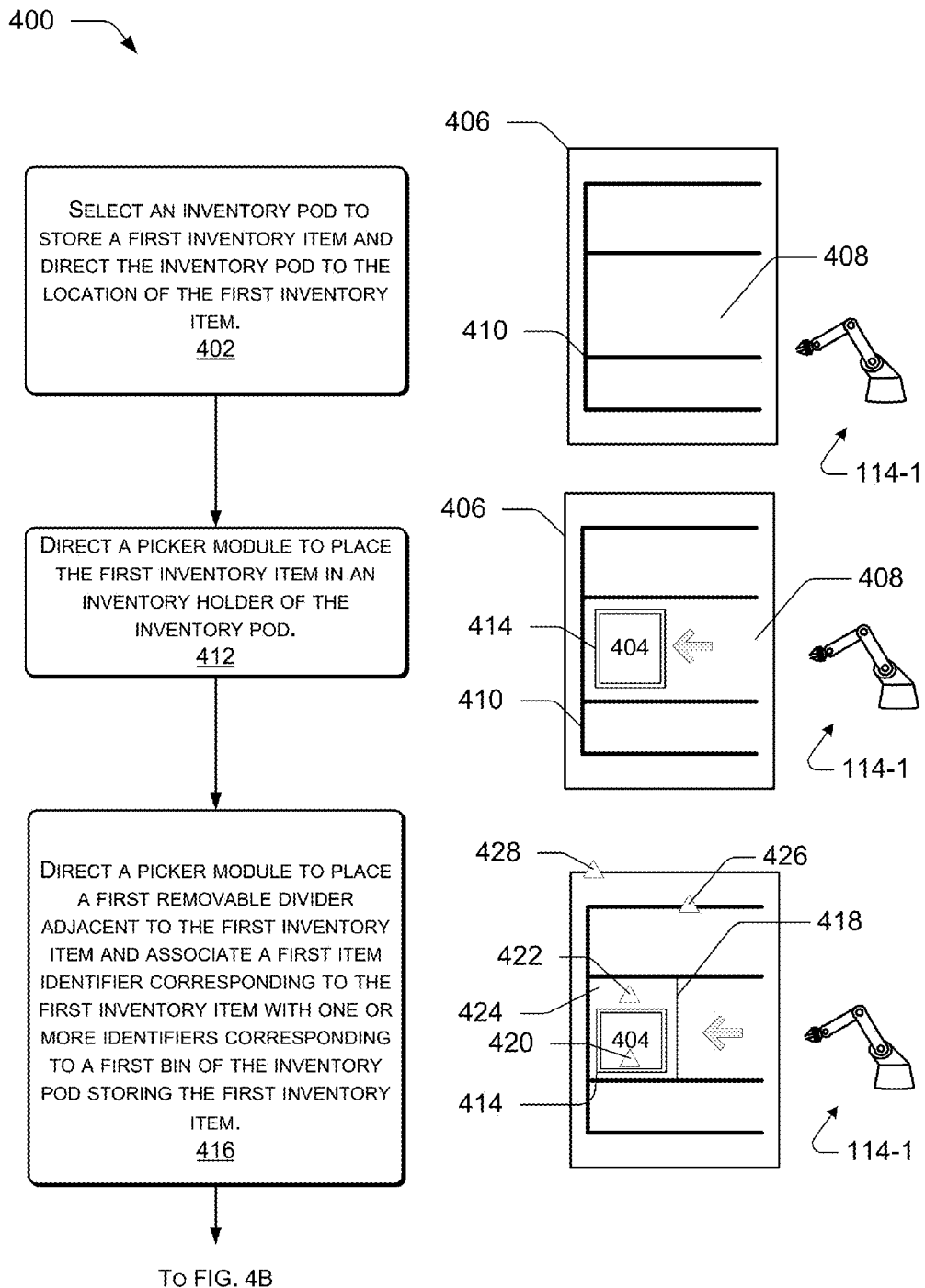

FIGS. 4A and 4B illustrate a process 400 for adding an inventory item to a dynamically reconfigurable inventory pod according to some implementations. In some examples, the process 400 may be executed, at least in part, by the electronic devices discussed above in FIGS. 1-3. The process 400 is illustrated as a collection of blocks in a logical flow graph, which represent a sequence of operations that can be implemented in hardware, software, or a combination thereof. The blocks are referenced by numbers 402, 412, 416, 430, and 436. Adjacent to the collection of blocks is a set of images to illustrate corresponding example actions from a top view of an inventory holder. In the context of software, the blocks represent computer-executable instructions stored on one or more computer-readable media that, when executed by one or more processing units (such as hardware microprocessors), perform the recited operations. Computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 402, a management module selects an inventory pod to store a first inventory item within an inventory system and directs the inventory pod to the location of the first inventory item. For example, the management module 108 (not shown in FIG. 4A) may receive a request to stock an item, e.g., a toaster 404, from the storage region 102 (not shown in FIG. 4A). As a result, the management module 108 may determine the physical dimensions of the toaster 404 and the location of the toaster 404 within the storage region 102. Further, the management module 108 may identify an inventory pod 406 having an inventory holder 410 with a storage channel 408 that can accommodate the physical dimensions of the toaster 404 based at least in part on the width of the storage channel 408 and the unused space of the storage channel 408. For instance, the management module 108 may send an inventory pod 406 with an empty inventory holder 410 having a storage channel 408 that can fit the physical dimensions of the toaster 404. Once the management module 108 selects the inventory pod 406, the management module 108 may direct the inventory pod 406 to the location of the toaster 404.

At 412, the management module may direct a picking module to place the first inventory item in an inventory holder of the inventory pod. For example, the management module 108 may send an instruction to the robotic arm 114-1 of the storage region 102 to place the toaster 404 into the storage channel 408 of the inventory pod 406. In some examples, the management module 108 may instruct the robotic arm 114-1 to place the toaster 404 in an inventory holder position 414 within the storage channel 408.

At 416, the management module may direct a picking module to place a first removable divider adjacent to the first inventory item in the inventory holder of the inventory pod and associate a first item identifier corresponding to the first inventory item with one or more identifiers corresponding to a first bin of the inventory pod storing the first inventory item. For example, the management module 108 may send an instruction to a robotic arm 114-1 of the storage region 102 to place a first removable divider 418 inside of the storage channel 408 in a location adjacent to the toaster 404. In some examples, the management module may instruct the robotic arm 114 of a distance value with respect to the toaster 404 at which to place the first removable divider 418. In some other examples, the management module 108 or the picking module 114-1 may determine a distance with respect to the toaster 404 at which to place the first removable divider 418 based in part on the physical dimensions of the toaster 404 and/or the dimensions of one or more picking modules 114 that may manipulate the toaster 404 at a station within the inventory system 100. Additionally, or alternatively, the robotic arm 114-1 may utilize one or more sensors (e.g., pressure sensor, position sensor, proximity sensor, imaging sensor, etc.) to determine the distance away from the toaster 404 at which to place the first removable divider 418. Further, in some examples, steps 412 and 416 may be performed simultaneously.

Once the first removable divider 418 has been placed in the storage channel 408 adjacent to the toaster 404, the management module 108 may associate a first inventory item identifier 420 corresponding to the toaster 404 with a first bin identifier 422 corresponding to a first bin 424 established by the first removable divider 418, an inventory holder identifier 426 corresponding to the inventory holder 410, and/or an inventory pod identifier 428 corresponding to the inventory pod 406. Further, the management module 108 may associate the bin identifier 422 with the inventory holder position 414.

At 430, the management module may select the inventory pod to store a second inventory item within the inventory system, and direct a picking module to place the second inventory item in the inventory holder of the inventory pod. For example, the management module 108 may receive a request to transport another item, e.g., a flashlight 432, from the storage region 102 to another station of the inventory system 100. In response, the management module 108 may select the inventory pod 406 to transport the flashlight 432 based at least in part on the destination station of the flashlight 432 being in proximity to the destination of the toaster 404, and the storage channel 408 being able to accommodate the physical dimensions of the flashlight 432. Further, the management module 108 may send an instruction to a robotic arm 114-1 to place the flashlight 432 in the storage channel 408 of the inventory pod 406 in a second inventory holder position 434 adjacent to the first removable divider 418. In some examples, the management module 108 or the picking module 114-1 may determine a distance value with respect to the first removable divider 418 at which to place the flashlight 432 based in part on the physical dimensions of the flashlight 432 and/or the dimensions of one or more picking modules 114 that may manipulate the flashlight 432 at a station within the inventory system 100. Additionally, or alternatively, the robotic arm 114-1 may utilize one or more sensors (e.g., pressure sensor, position sensor, proximity sensor, imaging sensor, etc.) to determine the distance away from the first removable divider 418 at which to place flashlight 432.

At 436, the management module may direct a picking module to place a second removable divider adjacent to the second inventory item in the inventory holder of the inventory pod and associate a second item identifier corresponding to the second inventory item with one or more identifiers corresponding to a second bin of the inventory pod storing the second inventory item. For example, the management module 108 may send an instruction to the robotic arm 114-1 of the storage region 102 to place a second removable divider 438 inside of the storage channel 408 adjacent to the flashlight 432. In some examples, the management module 108 may instruct the robotic arm 114-1 of a distance with respect to the flashlight 432 at which to place the second removable divider 438. In some examples, the management module 108 or the picking module 114-1 may determine the distance with respect to the flashlight 432 at which to place the second removable divider 438 based in part on the physical dimensions of the flashlight 432 and/or the dimensions of one or more picking modules 114 that may manipulate the flashlight 432 at a station within the inventory system 100. Additionally, or alternatively, the robotic arm may utilize one or more sensors (e.g., pressure sensor, position sensor, proximity sensor, imaging sensor, etc.) to determine the distance value with respect to the flashlight 432 at which to place second removable divider 438. Further, in some examples, steps 430 and 436 may be performed simultaneously.

Once the second removable divider 438 has been placed in the storage channel 408 adjacent to the flashlight 432, the management module 108 may associate a second item identifier 440 corresponding to the flashlight 432 with a second bin identifier 442 corresponding a second bin 444 established by the second removable divider 438, the inventory holder identifier 426, and/or the inventory pod identifier 428.

Figure 5A:
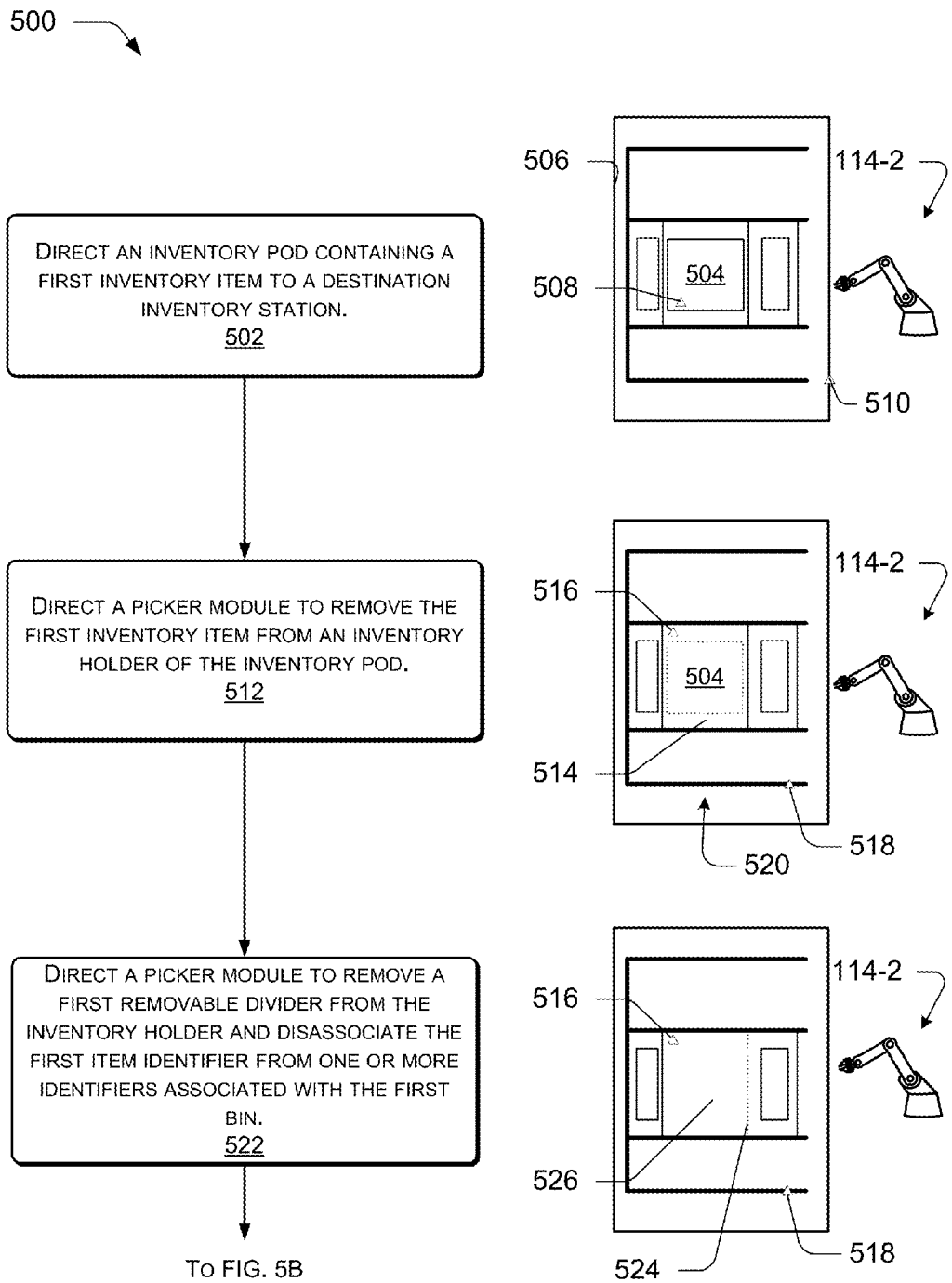
Figure 5B:
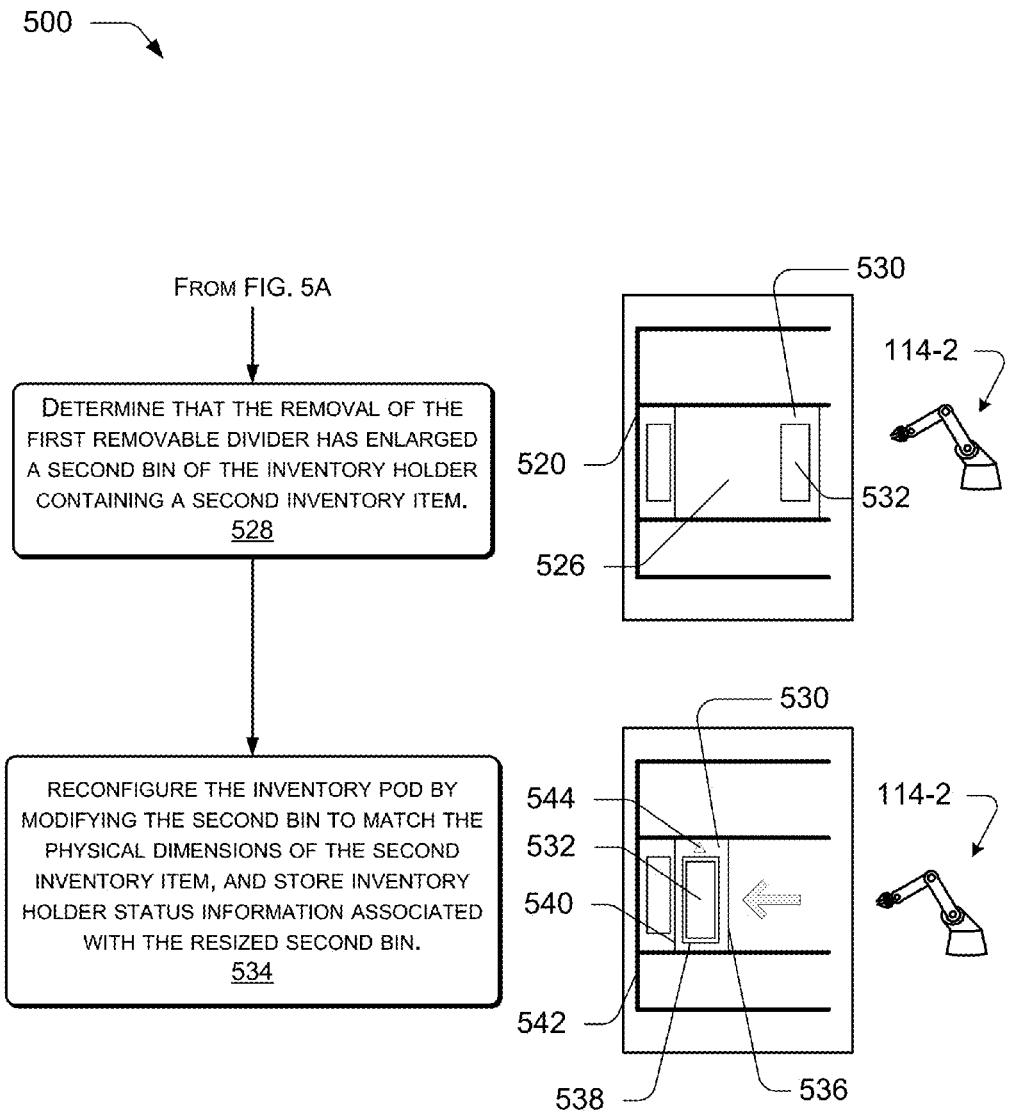

FIGS. 5A and 5B illustrate a process 500 for removing an inventory item from a dynamically reconfigurable inventory pod according to some implementations. In some examples, the process 500 may be executed, at least in part, by the electronic devices discussed above in FIGS. 1-3. The process 500 is illustrated as a collection of blocks in a logical flow graph, which represent a sequence of operations that can be implemented in hardware, software, or a combination thereof. The blocks are referenced by numbers 502, 512, 522, 528, and 534. Adjacent to the collection of blocks is a set of images to illustrate corresponding example actions from a top view of an inventory holder. In the context of software, the blocks represent computer-executable instructions stored on one or more computer-readable media that, when executed by one or more processing units (such as hardware microprocessors), perform the recited operations. Computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 502, a management module may direct an inventory pod containing a first inventory item to a destination inventory station. For example, the management module 108 (not shown in FIG. 5A) may receive a request to transport an item, e.g., a toaster 504, stored in an inventory pod 506, such as inventory pod 300, to the pick station 104 (not shown in FIG. 5A). As a result, the management module 108 may determine that inventory pod 506 contains the toaster 504 based at least in part on a mapping between a first inventory item identifier 508 corresponding to the toaster 504 and an inventory pod identifier 510 corresponding to the inventory pod 506. Further, the management module 108 (not shown in FIG. 5A) may direct the inventory pod 506 to transport the toaster 504 to the pick station 104.

At 512, the management module may direct a picking module to remove the first inventory item from an inventory holder of the inventory pod. For example, the management module 108 may send an instruction to the robotic arm 114-2 of the pick station 104 to remove the toaster 504 from a first bin 514 of the inventory pod 506. The management module 108 may determine that the first bin 514 is storing the toaster 504 based at least in part on a mapping between the first inventory item identifier 508 and a first bin identifier 516 corresponding to the first bin 514 and/or an inventory holder identifier 518 corresponding to an inventory holder 520 that includes the first bin 514 and/or the inventory pod identifier 510 corresponding to the inventory pod 506.

At 522, the management module may direct a picking module to remove a first removable divider from the inventory holder and disassociate the first item identifier from one or more identifiers associated with the first bin of the inventory pod vacated by the first inventory item. For example, the management module 108 may send an instruction to the robotic arm 114-2 to remove a first removable divider 524 adjacent to a first inventory holder position 526 vacated by the toaster 504. Further, the management module 108 may delete a mapping between the first inventory item identifier 508, and the first bin identifier 516 and/or the inventory holder identifier 518 and/or the inventory pod identifier 510. In some examples, steps 512 and 522 may be performed simultaneously. Further, in some examples, the first bin 514 may hold a plurality of inventory items. Therefore, the management module 108 may perform step 522 when all of the items held in the first bin 514 are removed At 528, the management module may determine that the removal of the first removable divider has enlarged a second bin of the inventory holder containing a second inventory item. For example, the management module 108 may determine that the removal of the first removable divider 524 has increased the size of a second bin 530 storing another item, e.g., a flashlight 532. In some examples, the management module 108 may determine that the size of second bin 530 has been increased based in part on inventory holder status information stored by the management module 108 that includes the contents, locations, and sizes of the bins of the inventory holder 520. Additionally, or alternatively, one or more sensors may detect the presence of the area defined by the first inventory holder position 526 being added to the second bin 530.

At 534, the management module may reconfigure the inventory pod by modifying the second bin to match the physical dimensions of the second inventory item, and store inventory holder status information associated with the modified second bin. For instance, the management module 108 may direct the picking module 114-2 to push or otherwise relocate a second removable divider 536 and the flashlight 532 into the second inventory holder position 538 that may include portions of the first inventory holder position 526 vacated by the toaster 504, thereby reconfiguring the second bin 530. In some other instances, the picking module 114-2 may pick up the flashlight 532 and the second removable divider 536, and place the flashlight 532 and the second removable divider 536 in the second inventory holder position 538 adjacent to a third removable divider 540. As shown in FIG. 5B, the management module 108 may direct the picking module 114-2 to relocate the second removable divider 536 and the flashlight 532 towards a vertical wall 542 opposite an open face of the inventory holder 520.

Once the picking module 114-2 resizes the second bin, the management module 108 may update inventory holder status information associated with the inventory holder 520 to include the new size of the second bin 530 and/or the location of the second bin 530 at the second inventory holder position 538. For instance, a second bin identifier 544 may be associated with the second inventory holder position 538.

Figure 6A:
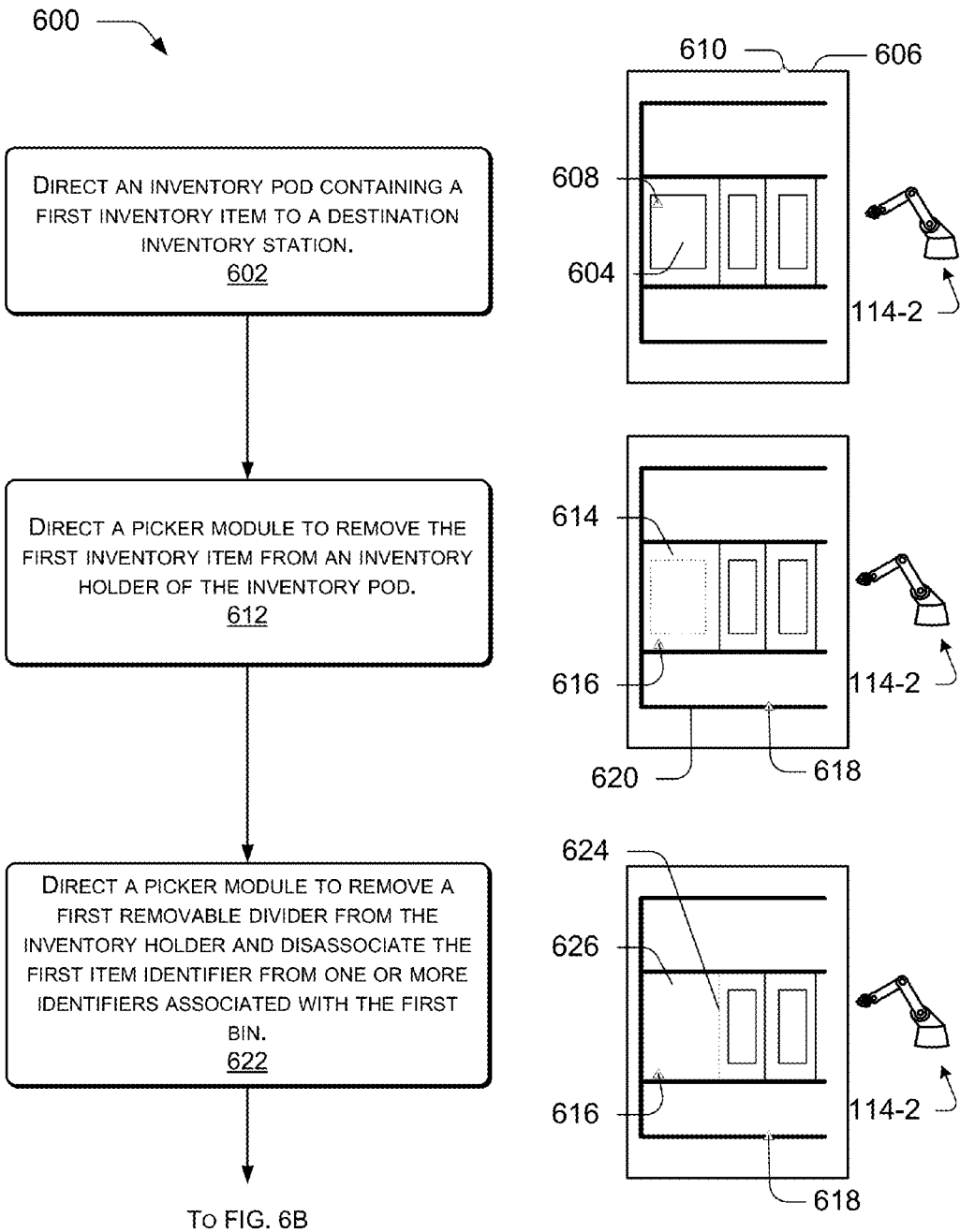
Figure 6B:
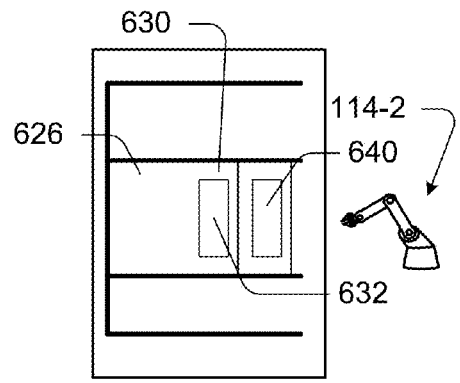
Figure 6B:
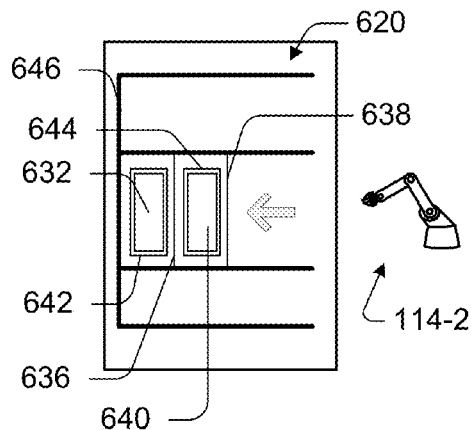

FIGS. 6A and 6B illustrate a process 600 for removing an inventory item from a dynamically reconfigurable inventory pod according to some implementations. In some examples, the process 600 may be executed, at least in part, by the electronic devices discussed above in FIGS. 1-3. The process 600 is illustrated as a collection of blocks in a logical flow graph, which represent a sequence of operations that can be implemented in hardware, software, or a combination thereof. The blocks are referenced by numbers 602, 612, 622, 628, and 634. Adjacent to the collection of blocks is a set of images to illustrate corresponding example actions from a top view of an inventory holder. In the context of software, the blocks represent computer-executable instructions stored on one or more computer-readable media that, when executed by one or more processing units (such as hardware microprocessors), perform the recited operations. Computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 602, a management module may direct an inventory pod containing a first inventory item to a destination inventory station. For example, the management module 108 (not shown in FIG. 6A) may receive a request to transport an item, e.g., a toaster 604, stored in an inventory pod 606, such as inventory pod 300, to the pick station 104 (not shown in FIG. 6A). As a result, the management module 108 may determine that inventory pod 606 contains the toaster 604 based at least in part on a mapping between a first inventory item identifier 608 corresponding to the toaster 604 and an inventory pod identifier 610 corresponding to the inventory pod 606. Further, the management module 108 (not shown in FIG. 6A) may direct the inventory pod 606 to transport the toaster 604 to the pick station 104.

At 612, the management module may direct a picking module to remove the first inventory item from an inventory holder of the inventory pod. For example, the management module 108 may send an instruction to the robotic arm 114-2 of the pick station 104 to remove the toaster 604 from a first bin 614 of the inventory pod 606. The management module 108 may determine that the first bin 614 is storing the toaster 604 based at least in part on a mapping between the first inventory item identifier 608 and a first bin identifier 616 corresponding to the first bin 614 and/or an inventory holder identifier 618 corresponding to an inventory holder 620 that includes the first bin 614 and/or the inventory pod identifier 610 corresponding to the inventory pod 606.

At 622, the management module may direct a picking module to remove a first removable divider from the inventory holder and disassociate the first item identifier from one or more identifiers associated with the first bin of the inventory pod storing the first inventory item. For example, the management module 108 may send an instruction to the robotic arm 114-2 to remove a first removable divider 624 adjacent to a first inventory holder position 626 vacated by the toaster 604. Further, the management module 108 may delete a mapping between the first inventory item identifier 608, and the first bin identifier 616 and/or the inventory holder identifier 618 and/or the inventory pod identifier 610. In some examples, steps 612 and 622 may be performed simultaneously.

At 628, the management module may determine that the removal of the first removable divider has enlarged a second bin of the inventory holder containing a second inventory item. For example, the management module 108 may determine that the removal of the first removable divider 624 has increased the size of a second bin 630 storing another item, e.g., a flashlight 632. In some examples, the management module 108 may determine that the size of second bin 630 has been increased based in part on inventory holder status information stored by the management module 108 that includes the contents, locations, and/or sizes of the bins of the inventory holder 620. Additionally, or alternatively, one or more sensors may detect the presence of the area defined by the first inventory holder position 626 being added to the second bin 630.

At 634, the management module may reconfigure the inventory pod by modifying the second bin and one or more additional bins within the same storage channel of the inventory holder as the second bin, e.g., a third bin, and store inventory holder status information associated with the reconfigured bins. For instance, the management module 108 may direct the picking module 114-2 to push a second removable divider 636, the flashlight 632, a third removable divider 638, and a further item, e.g., a pair of sneakers 640, towards the first inventory holder position 626 vacated by the toaster 604, thereby relocating the flashlight 632 to a second inventory holder position 642 and the sneakers to a third inventory holder position 644. As shown in FIG. 6B, the management module 108 may direct the picking module 114-2 to move the second removable divider 636, the flashlight 632, the third removable divider 638, and the pair of sneakers 640 towards a vertical wall 646 opposite an open face of the inventory holder 620.

Once the picking module 114-2 reconfigures the second bin and the third bin, the management module 108 may update inventory holder status information associated with the inventory holder 620 to include the new sizes of the second bin and the third bin, and/or the inventory holder positions of the second bin and the third bin. For example, the inventory holder status information may be updated to associate an identifier of the second bin with the second inventory holder position 642 and/or to associate an identifier of the third bin with the third inventory holder position 644.

Figure 7:
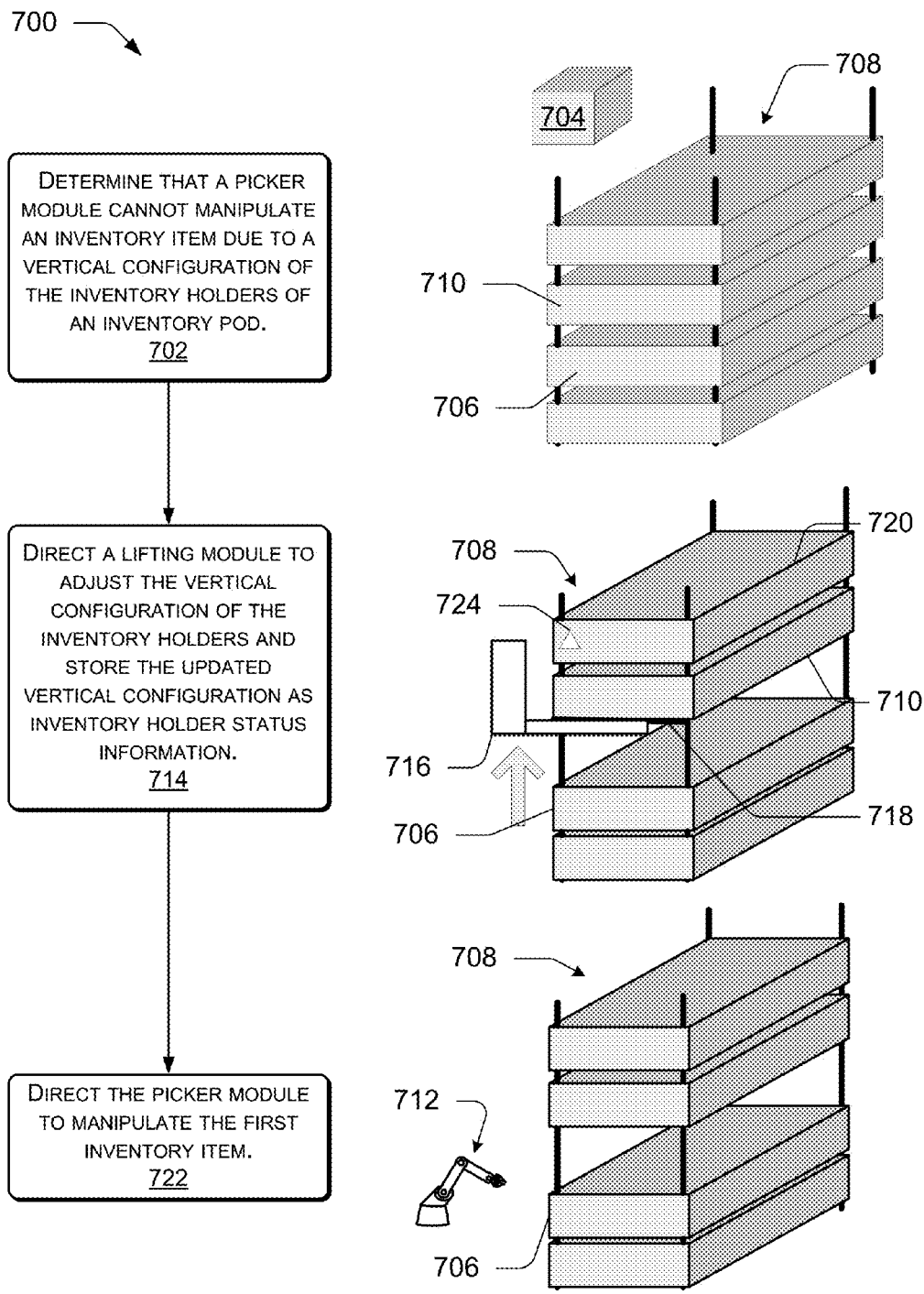

FIG. 7 illustrates a process 700 for adjusting the inventory holders of an inventory pod according to some implementations. In some examples, the process 700 may be executed, at least in part, by the electronic devices discussed herein in FIGS. 1-3. The process 700 is illustrated as a collection of blocks in a logical flow graph, which represent a sequence of operations that can be implemented in hardware, software, or a combination thereof. The blocks are referenced by numbers 702, 714, and 722. Adjacent to the collection of blocks is a set of images to illustrate corresponding example actions. In the context of software, the blocks represent computer-executable instructions stored on one or more computer-readable media that, when executed by one or more processing units (such as hardware microprocessors), perform the recited operations. Computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 702, a management module may determine that a picking module may not manipulate an inventory item in accordance with an inventory system task due to a vertical configuration of the inventory holders of an inventory pod. For example, the management module 108 (not shown in FIG. 7) may receive a request to place an item, e.g., a microwave 704, into a first inventory holder 706 of an inventory pod 708, such as inventory pod 300, at the storage region 102 (not shown in FIG. 7). Prior to completing the request, the management module 108 may determine the physical dimensions of the microwave 704. Further, the management module 108 may determine a vertical distance between the first inventory holder 706 and a second inventory holder 710 located directly above the first inventory holder 706. The management module 108 may compare the physical dimensions of the microwave 704 to the vertical distance, and determine that robotic arm 712 cannot safely place the microwave 704 into the first inventory holder 706. In some examples, the management module 108 may determine that a robotic arm 712 cannot safely manipulate the microwave 704 based at least in part on the vertical distance between the first inventory holder 706 and the second inventory 710 holder not exceeding at least one of the physical dimensions of the microwave 704 by a predetermined threshold.

At 714, the management module may direct a lifting module to adjust the vertical configuration of the inventory holders of the inventory pod and store the vertical configuration of the inventory pod in an inventory pod database as inventory holder status information. For example, the management module 108 may direct a lifting device, e.g., a forklift 716 (shown schematically in FIG. 7) to raise the second inventory holder 710 and any additional inventory holders above inventory holder 710, e.g., a third inventory holder 720. In some examples, the management module 108 and/or the forklift 716 may manipulate one or more inventory holder supports 718, such as frame spacers 222 and/or inventory holder support elements 224, of the inventory pod 708 to adjust the vertical position of the second inventory holder 710 and a third inventory holder 720. In some other examples, the inventory holder supports 718 may be capable of adjusting the vertical configuration of the inventory holders of the inventory pod via mechanical, electromechanical, pneumatic, hydraulic or other types of automation.

At 722, the management module may direct the picking module to manipulate the inventory item in accordance with an inventory system task. For example, the management module 108 may send an instruction to the robotic arm 712 to place the microwave 704 into the first inventory holder 706 of the inventory pod 708, as described with respect to FIGS. 4A and 4B, for example. In addition, after the robotic arm 712 has placed the microwave 704 into the first inventory holder 706, the management module 108 may send an instruction to the forklift 716 to re-adjust the vertical configuration back to its original vertical configuration. In some other instances, the management module 108 may send an instruction to the forklift 716 to re-adjust the vertical configuration to an optimal vertical configuration based at least in part on the physical dimensions of the items stored within the inventory pod 708. For example, the optimal configuration may minimize the vertical distances between the inventory holders 706, 710, and 720 while protecting stored items, e.g., the microwave 704, from being damaged by overhead inventory holders, e.g., inventory holders 710 and 720.

Once the vertical configuration of the inventory holders 706, 710, and 720 has been adjusted to allow for the manipulation of the microwave 704, the management module 108 may store the new vertical configuration of the inventory holders 706, 710, and 720 with an inventory pod identifier 724 corresponding to the inventory pod 708 in an inventory pod database.

In addition, the process 700 for adjusting the inventory holders of an inventory pod may be employed to remove an inventory item from a dynamically reconfigurable inventory pod, as described with respect to FIGS. 5A-6B.

Figure 8:
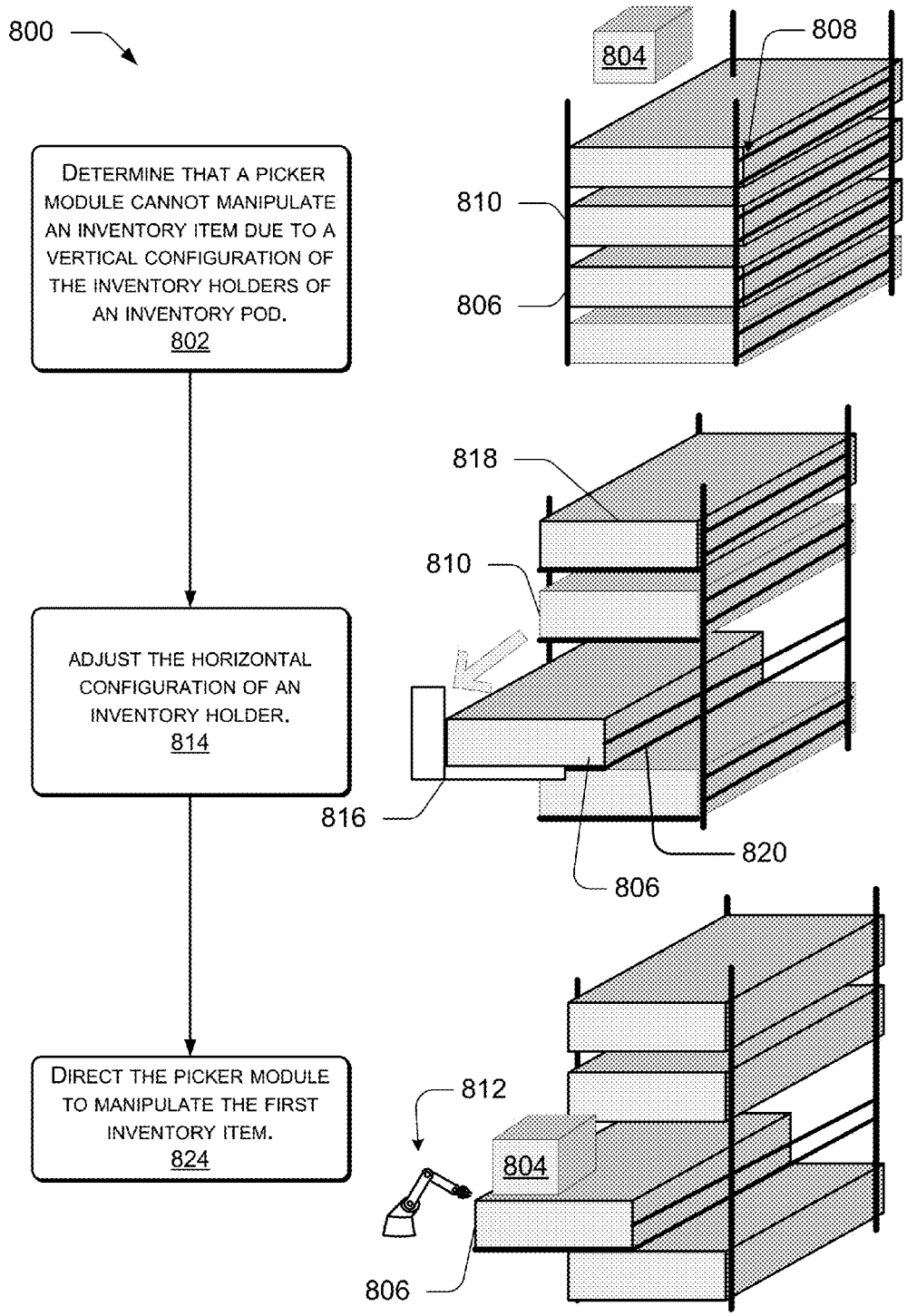

FIG. 8 illustrates a process 800 for adjusting the inventory holders of an inventory pod according to some implementations. In some examples, the process 800 may be executed, at least in part, by the electronic devices discussed herein in FIGS. 1-3. The process 800 is illustrated as a collection of blocks in a logical flow graph, which represent a sequence of operations that can be implemented in hardware, software, or a combination thereof. The blocks are referenced by numbers 802, 814, and 824. Adjacent to the collection of blocks is a set of images to illustrate corresponding example actions. In the context of software, the blocks represent computer-executable instructions stored on one or more computer-readable media that, when executed by one or more processing units (such as hardware microprocessors), perform the recited operations. Computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 802, a management module may determine that a picking module may not manipulate an inventory item in accordance with an inventory system task due to a vertical configuration of the inventory holders of an inventory pod. For example, the management module 108 (not shown in FIG. 8) may receive a request to place an item, e.g., a microwave 804, into a first inventory holder 806 of an inventory pod 808, such as inventory pod 300, at the storage region 102 (not shown in FIG. 8). Prior to completing the request, the management module 108 may determine the physical dimensions of the microwave 804. Further, the management module 108 may determine a vertical distance between the first inventory holder 806 and a second inventory holder 810 located directly above the first inventory holder 806. The management module 108 may compare the physical dimensions of the microwave 804 to the vertical distance, and determine that a robotic arm 812 cannot safely place the microwave 804 into the first inventory holder 806. In some examples, the management module 108 may determine that the robotic arm 812 cannot safely manipulate the microwave 804 based at least in part on the vertical distance between the first inventory holder 806 and the second inventory 810 holder not exceeding at least one of the physical dimensions of the microwave 804 by a predetermined threshold.

At 814, the management module may adjust a horizontal configuration of the inventory holders of the inventory pod. For example, the management module 108 may direct an actuating device, e.g., a forklift 816, to horizontally shift the first inventory holder 806, thereby moving the first inventory holder 806 from a position below the second inventory holder 810 and any additional overhead inventory holders, e.g., a third inventory holder 818, to a position wherein at least a part of the first inventory holder 806 is not covered by the second inventory holder 810 and the third inventory holder 818. In some examples, the management module 108 and/or the forklift 816 may manipulate one or more inventory holder supports 820, such as frame spacers 222 and/or inventory holder support elements 224, of the inventory pod 808 to adjust the horizontal position of the first inventory holder 806. In some other examples, the inventory holder supports 820 may be capable of adjusting the horizontal configuration of the inventory holders 806, 810 and 818 of the inventory pod 808.

At 824, the management module may direct the picking module to manipulate the inventory item in accordance with an inventory system task. For example, the management module 108 may send an instruction to the robotic arm 812 to place the microwave 804 into the first inventory holder 806 of the inventory pod 808, as described with respect to FIGS. 4A and 4B, for example.

In addition, the process 800 for adjusting the inventory holders of an inventory pod may be employed to remove an inventory item from a dynamically reconfigurable inventory pod, as described with respect to FIGS. 5A-6B.

FIGS. 3-8 are merely representative examples of the dynamic inventory pod reconfiguration process being used at various regions within an inventory system. These are not intended to be limiting, and other uses and variations of the process may be used. For instance, the management module may direct a picking module or an inventory pod to dynamically reconfigure a plurality of bins in response to the removal of an item and an associated removable divider.

Figure 9:
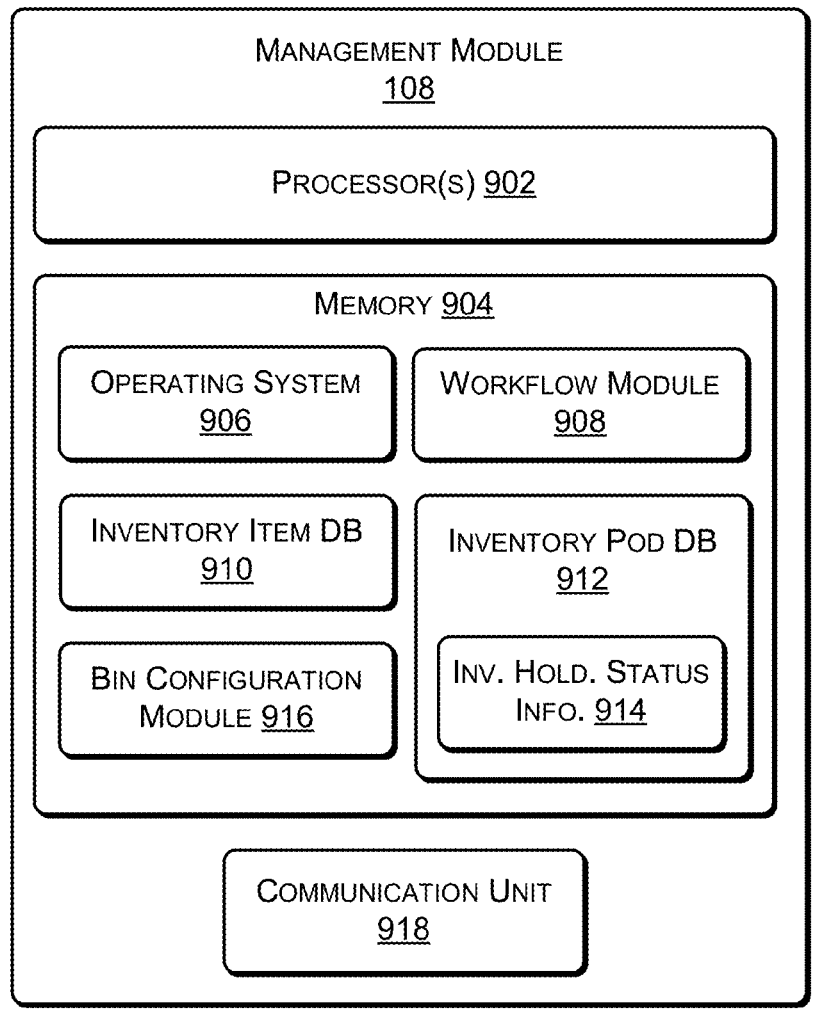
FIG. 9 illustrates select components of an example management module, according to some implementations.

FIG. 9 shows select components in the management module 108 according to one possible implementation. The management module 108 may be implemented by one or more computers having processing, memory, and communications capabilities. The management module 108 may be a dedicated device or computer system programmed to perform the management operations.

In FIG. 9, the management module 108 includes one or more processors 902 and memory 904. The processor(s) 902 are configured to execute instructions, such as those instructions stored in memory 904, or in other memory accessible to the processor(s) 902, such as storage in cloud-based resources. The memory 904 may include CRSM. The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules, such as instructions, datastores, and so forth may be stored within the memory 904 and configured to execute on a processor(s) 902. An operating system module 906 is configured to manage hardware and services within and coupled to the management module 108 for the benefit of other components.

A workflow module 908 may provide a list of tasks as-needed for the routing of the inventory items 110 (not shown in FIG. 9) through the warehouse. In that way, the management module 108 may either micro manage each movement of the inventory items 110 throughout an inventory process, or may simply provide a plan and timing for the regions of the inventory system 100 to carry out on their own independently of further instructions.

An inventory item database 910 is configured to identify, track and locate inventory items 110 throughout the inventory system 100. The inventory item database 910 may store information for a plurality of inventory items 110 within the inventory system 100, with individual inventory items 110 being associated with one or more inventory item identifiers. Further, the inventory item database 910 may store one or more physical dimensions of individual inventory items 110 within the inventory system 100. In addition, in some examples, the inventory item database 910 may include temporary data structures that may be used to locate an inventory item 110 within the inventory system. For example, the inventory item database 910 may store a temporary association that includes a mapping from an inventory item identifier to at least one of a region identifier corresponding to a region of the inventory system 100, an inventory pod identifier, an inventory holder identifier, an inventory holder position, and/or a bin identifier.

The inventory pod database 912 is configured to identify, track and locate inventory pods 112 throughout the inventory system 100. The inventory pod database 912 may store information for a plurality of inventory pods within the inventory system 100, with individual inventory pods being associated with one or more inventory pod identifiers. For instance, the inventory pod database 912 may identify inventory items 110 stowed on individual inventory pods 112 (not shown in FIG. 9) within the inventory system 100.

The inventory pod database 912 may store capability information including the power trains, load capacities, and other specifications related to transport of inventory items for individual inventory pods 112. In some examples, the management module 108 may assign an inventory pod 112 to an inventory system task based at least in part on capability information associated with the inventory pod 112 in the inventory pod database 912. Further, the inventory pod database 912 may store information indicating the location of individual inventory pods 112 within the inventory system 100. In some examples, the management module 108 may assign an inventory pod 112 to an inventory system task based at least in part on location information associated with the inventory pod 112 in the inventory pod database 912.

The inventory pod database 912 may store inventory holder status information 914 for individual inventory pods 112 within the inventory system 100. The inventory holder status information 914 may include data describing the number of inventory holders 120 forming an inventory pod, the physical dimensions of each of the inventory holders 120 of the inventory pod 112, and the vertical configuration of the inventory holders 120 with respect to each other. In some examples, the management module 108 may determine whether to place an inventory item 110 onto an inventory pod 112 based on the inventory holder status information 914. For instance, if the inventory holder status information 914 indicates that an inventory pod 112 has an inventory holder 120 that can accommodate the physical dimensions of an inventory item 110, the management module 108 may assign the storage and/or transport of the inventory item 110 to the inventory pod 112.

Further, the inventory holder status information 914 may describe the contents of the inventory holders 120 (not shown in FIG. 9) of the inventory pods 112. For example, the inventory holder status information 914 may include one or more temporary associations mapping at least one of an inventory holder identifier, an inventory holder position, and/or a bin identifier to an inventory item identifier. In addition, the inventory holder status information 914 may include one or more temporary associations between bin identifiers and inventory holder positions to provide locations of bins within an inventory holder. The inventory holder positions may include descriptions (e.g., coordinates, boundaries, markers, etc.) of locations within the inventory holder. Therefore, as bins are dynamically configured by the management module, the inventory holder positions mapped to bins may be updated to reflect the modification of the sizes and/or locations of the bins. In some examples, an increase in the size of a bin over a predetermined threshold may trigger the bin reconfiguration process as described herein.

In addition to providing the specific contents of the inventory pods 112, the inventory holder status information may further include data describing the unused area of an inventory pod. For example, the inventory holder status information may indicate an amount of unused surface area for individual storage channels of the inventory holders of the inventory pod.

A bin configuration module 916 is configured to direct the inventory pods, picking modules, and lifting modules to perform the dynamic reconfiguration process described herein at various times and locations throughout the inventory system 100. The bin configuration module 916 may provide a list of tasks to fully perform the bin configuration, or may provide instructions as-needed for the inventory pods, picking modules, and lifting/actuating modules to dynamically reconfigure bins of the inventory holders. Further, the bin configuration module 916 may query the inventory item database 910 and/or the inventory pod database 912 based in part on inventory pod identifiers, inventory holder identifiers, bin identifiers and/or inventory item identifiers. In some examples, the bin configuration module may determine whether to reconfigure a bin based in part on information returned in response to the query. The management module 108 further includes a communication unit 918 to communicate with various regions of the fulfillment system 100 or with other computing devices. The communication unit 918 enables access to one or more types of networks, including wired and wireless networks. For example, the coupling between the management module 108 and any components in the inventory system may be via wired technologies, wireless technologies (e.g., RF (radiofrequency), cellular, satellite, Bluetooth, etc.), or other connection technologies.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An inventory system comprising:
a plurality of inventory holders configured to hold one or more items in inventory, wherein individual inventory holders have fixed dividers aligned in a first direction to form at least one storage channel to receive the one or more items;
one or more mobile drive units configured to transport the inventory holders about a facility;
one or more robotic pickers controllable to place items into the inventory holders and to remove items from the inventory holders;
an item database configured to store physical dimensions of the items and storage locations of the items within the facility; and
a management module configured to:
 receive a request to store an item having an item identifier in one of the plurality of inventory holders;
 determine, from the item database, a location of the item within the facility based at least part on the item identifier;
 determine, from the item database, dimensions of the item based at least in part on the item identifier;
 identify an inventory holder having an available inventory holder position within a storage channel to store the item based at least in part on the dimensions of the item, a width of the storage channel formed by the fixed dividers, and an available storage area of the available inventory holder position within the storage channel;
direct a mobile drive unit to position the inventory holder proximal to the location of the item;
direct a robotic picker to transfer the item from the location to the available inventory holder position within the storage channel of the inventory holder;
direct the robotic picker to place a removable divider within the storage channel adjacent to the item and aligned in a second direction approximately perpendicular to the first direction of the fixed dividers;
receive a request to transfer the item having the item identifier from the inventory holder to a pick station;
direct a mobile drive unit to transport the inventory holder to the pick station;
direct a robotic picker to transfer the item from the inventory holder to the pick station; and
direct the robotic picker to remove the removable divider adjacent to the item from within the storage channel of the inventory holder.

2. The inventory system as recited in claim 1, wherein the item is a first item, the dimensions are first item dimensions, the removable divider is a first removable divider, and the inventory holder position is a first inventory holder position, and the management module is further configured to:
identify a second item occupying a second inventory holder position within the storage channel between a second removable divider and the vacated first inventory holder position based at least in part on the item database;
direct a robotic picker to relocate the second item to at least a part of the first inventory holder position; and
direct the robotic picker to relocate the second removable divider within the storage channel adjacent to the relocated second item and aligned in the second direction approximately perpendicular to the first direction of the fixed dividers based at least in part on second item dimensions of the second item.

3. The inventory system as recited in claim 1, wherein the item is a first item, the item identifier is a first item identifier, the location is a first location, the dimensions are first item dimensions, the removable divider is a first removable divider, and the inventory holder position is a first inventory holder position, and management module is further configured to:
determine a second location of a second item in the inventory from the item database based at least part on a second item identifier;
determine second item dimensions of the second item in the inventory from the item database based at least in part on the second item identifier;
determine that the inventory holder comprises an available second inventory holder position adjacent to the first inventory holder position to hold the second item based at least in part on the second item dimensions of the second item, the width of the storage channel of the inventory holder, and an available storage area of the available second inventory holder position within the storage channel;
direct a mobile unit to position the inventory holder proximal to the second location of the second item;
direct a robotic picker to transfer the second item from the second location to the second inventory holder position; and
direct the robotic picker to place a second removable divider within the storage channel adjacent to the second item and opposite the first removable divider, and aligned in the second direction approximately perpendicular to the first direction of the fixed dividers.

4. The inventory system as recited in claim 1, wherein the inventory holder is a first inventory holder, and the management module is further configured to:
determine that a vertical distance between the first inventory holder and at least one second inventory holder stacked above the first inventory holder does not exceed at least one dimension of the item by a threshold amount based in part on the dimensions of the item; and
direct a lifting module to lift the at least one second inventory holder to increase the vertical distance between the first inventory holder and the at least one second inventory holder to an amount greater than at least one dimension of the item.

5. A method comprising:
determining physical dimensions of an item, the item having an associated item identifier;
identifying an inventory holder having an available inventory holder position within at least one storage channel to hold the item based at least in part on the physical dimensions of the item, the inventory holder having fixed dividers aligned in a first direction that define the at least one storage channel;
instructing a robotic picker to place the item in the available inventory holder position within the at least one storage channel;
instructing the robotic picker to place a removable divider between the fixed dividers of the at least one storage channel and adjacent to the item, thereby dynamically configuring a bin for the item; and
storing, in an inventory pod database, an association between the item identifier associated with the item and at least one of an inventory holder identifier associated with the inventory holder and a bin identifier associated with the dynamically configured bin.

6. The method as recited in claim 5, further comprising:
instructing a mobile drive unit coupled to the inventory holder to move to a destination station associated with the item identifier;
instructing a robotic picker to remove the item from the inventory holder position at the destination station;
instructing the robotic picker to remove the removable divider adjacent to the removed item; and
deleting the association between the item identifier and at least one of the inventory holder identifier and the bin identifier from the inventory pod database.

7. The method as recited in claim 5, wherein the item is a first item, the item identifier is a first item identifier, the physical dimensions are first item dimensions, the removable divider is a first removable divider, and the inventory holder position is a first inventory holder position, and further comprising:
determining second item dimensions of a second item;
determining that the inventory holder comprises an available second inventory holder position within the at least one storage channel to hold the second item based at least in part on the second item dimensions of the second item and inventory holder status information;
instructing a robotic picker to transfer the second item to the second inventory holder position within the at least one storage channel; and
instructing the robotic picker to place a second removable divider between the fixed dividers of the at least one storage channel adjacent to the second item and opposite the first removable divider.

8. The method as recited in claim 6, wherein the item is a first item, the physical dimensions are first item dimensions, the removable divider is a first removable divider, and the inventory holder position is a first inventory holder position, and further comprising:

identifying a second item occupying a second inventory holder position within the at least one storage channel between a second removable divider and the vacated first inventory holder position based at least in part on inventory holder status information stored in the inventory pod database;

instructing a robotic picker to relocate the second item to at least a part of the first inventory holder position; and instructing the robotic picker to relocate the second removable divider within the at least one storage channel adjacent to the relocated second item and aligned in the second direction approximately perpendicular to the first direction of the fixed dividers based at least in part on second item dimensions of the second item.

9. The method as recited in claim 5, wherein the inventory holder is a first inventory holder, and further comprising:

determining a vertical distance between the first inventory holder and at least one second inventory holder stacked above the first inventory holder based at least in part on inventory holder status information stored in the inventory pod database;

determining that the vertical distance does not exceed at least one dimension of the item by a threshold amount; and instructing a lifting device to increase the vertical distance to an amount greater than the at least one dimension of the item.

10. The method as recited in claim 9, further comprising updating the inventory holder status information stored in the inventory pod database to include a representation of the increased vertical distance between the first inventory holder and the at least one second inventory holder.

11. The method as recited in claim 5, wherein determining the physical dimensions of an item further includes:

detecting the physical dimensions based at least in part on a sensor reading; or determining the physical dimensions from an item database based at least in part on the item identifier.

12. The method as recited in claim 5, wherein the robotic picker includes at least one of a robotic arm and a Cartesian coordinate robot.

13. A system comprising:

one or more processors;

an inventory pod database that includes information identifying location, size, and content of individual storage bins within at least one storage channel of an inventory pod;

an inventory item database that includes information identifying physical dimensions of individual inventory items within an inventory system;

a communication interface; and one or more computer-readable media; and processor-executable instructions maintained on the one or more computer-readable media which, when executed by the one or more processors, program the one or more processors to:

direct, via the communication interface, a robotic arm to remove a first inventory item from a first storage bin of the at least one storage channel of the inventory pod;

direct, via the communication interface, the robotic arm to remove a first removable bin divider associated with the first storage bin from the at least one storage channel;

determine that a second storage bin within the at least one storage channel has been enlarged;

determine a location and size for reconfiguring the second storage bin based at least in part on physical dimensions of a second inventory item stored in the second storage bin; and direct, via the communication interface, the robotic arm to reconfigure the second storage bin including a second removable bin divider within the at least one storage channel in accordance with the determined location and size.

14. The system as recited in claim 13, wherein the processor-executable instructions further program the one or more processors to:

direct, via the communication interface, the robotic arm to reconfigure at least one additional storage bin sharing the at least one storage channel with the second storage bin.

15. The system as recited in claim 14, wherein the processor-executable instructions further program the one or more processors to:

delete an association between a first bin identifier identifying the first storage bin and a first item identifier identifying the first inventory item in response to the removal of the first inventory item and the first removable bin divider.

16. The system as recited in claim 15, wherein the processor-executable instructions further program the one or more processors to:

associate a second bin identifier identifying the reconfigured second storage bin to at least one of the determined location and size in the inventory pod database and a second item identifier identifying the second inventory item.

17. The system as recited in claim 13, wherein the processor-executable instructions further program the one or more processors to:

determine physical dimensions of a third inventory item;

determine that the third inventory item fits within the at least one storage channel based at least in part upon a comparison of the physical dimensions of the third inventory item to inventory pod database information associated with the at least one storage channel;

direct the robotic arm to place the third inventory item within the storage channel adjacent to the second removable bin divider; and direct the robotic arm to place a third removable bin divider within the at least one storage channel adjacent to the third inventory item and opposite the second removable bin divider, thereby dynamically configuring a third storage bin.

18. The system as recited in claim 13, wherein the processor-executable instructions further program the one or more processors to:

determine the size of the reconfigured second storage bin based at least in part on a second item identifier associated with the second inventory item stored in the reconfigured second storage bin.

19. The system as recited in claim 13, wherein the processor-executable instructions further program the one or more processors to:
    determine the location of the reconfigured second storage bin based at least in part on a second bin identifier of the reconfigured second storage bin.

20. The system as recited in claim 13, wherein the processor-executable instructions further program the one or more processors to:
    determine the size and location of the second storage bin based at least in part on a 3D sensor reading of the second inventory item stored in the second storage bin.

* * * * *